United States Patent

Shimizu et al.

[11] Patent Number: 5,801,667
[45] Date of Patent: Sep. 1, 1998

[54] VEHICLE DISPLAY WHICH REDUCES DRIVER'S RECOGNITION TIME OF ALARM DISPLAY

[75] Inventors: Youji Shimizu, Yokohama; Takayuki Yanagishima, Yokosuka; Tomio Jindo, Yokohama; Wataru Yagihashi, Yokosuka, all of Japan

[73] Assignee: Nissan Motor Co., Ltd., Yokohama, Japan

[21] Appl. No.: 439,782

[22] Filed: May 12, 1995

[30] Foreign Application Priority Data

Jun. 2, 1994 [JP] Japan ................... 6-121374

[51] Int. Cl.⁶ ............... G09G 5/00; G08G 1/16; B60Q 1/00; H04N 7/00
[52] U.S. Cl. ............... 345/7; 340/903; 340/435; 340/436; 359/630; 348/115
[58] Field of Search ............... 345/7, 8, 9; 340/901–905, 340/945, 961, 963, 971, 983, 425.5, 435, 436; 359/630; 348/113, 115, 118, 119, 121–123

[56] References Cited

U.S. PATENT DOCUMENTS

| | | | |
|---|---|---|---|
| 4,722,601 | 2/1988 | McFarlane | 356/152 |
| 5,343,206 | 8/1994 | Ansaldi et al. | 342/70 |
| 5,414,439 | 5/1995 | Groves et al. | 345/7 |
| 5,519,410 | 5/1996 | Smalanskas et al. | 345/7 |
| 5,583,795 | 12/1996 | Smyth | 364/516.444 |

FOREIGN PATENT DOCUMENTS 6-16867  3/1994  Japan .................. G01P 1/10

*Primary Examiner*—John K. Peng
*Assistant Examiner*—John W. Miller
*Attorney, Agent, or Firm*—Foley & Lardner

[57] ABSTRACT

A vehicle display device including an information display unit for displaying prescribed information for a vehicle, an alarm need state detection unit for detecting a prescribed state where an alarm for the vehicle is needed, an alarm display unit for performing an alarm display on the basis of the detection of the alarm need state detection unit, an eye-fixed target detection unit for detecting an object on which a driver fixes his eyes as an eye-fixed target, a display cancel unit for canceling the eye-fixed target or its neighboring information display, and a delay unit for controlling the alarm display unit to perform the alarm display after a predetermined time lapse from the display cancellation of the display cancel unit.

17 Claims, 22 Drawing Sheets

《WHEN EYE-FIXED TARGET IS SPEEDOMETER》

FIG.6
ANALYZED IMAGE
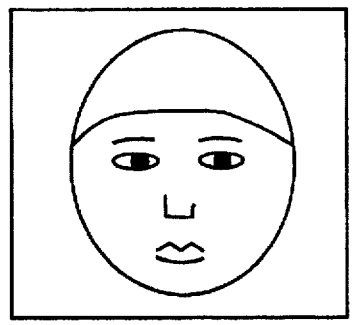
FIG.7
LOOK AT FRONT
(a)
LOOK AT HUD
(b)
LOOK AT CENTER CLUSTER
(c)
LOOK AT METER CLUSTER
(d)
LOOK ASIDE
(e)
DOZE
(f)

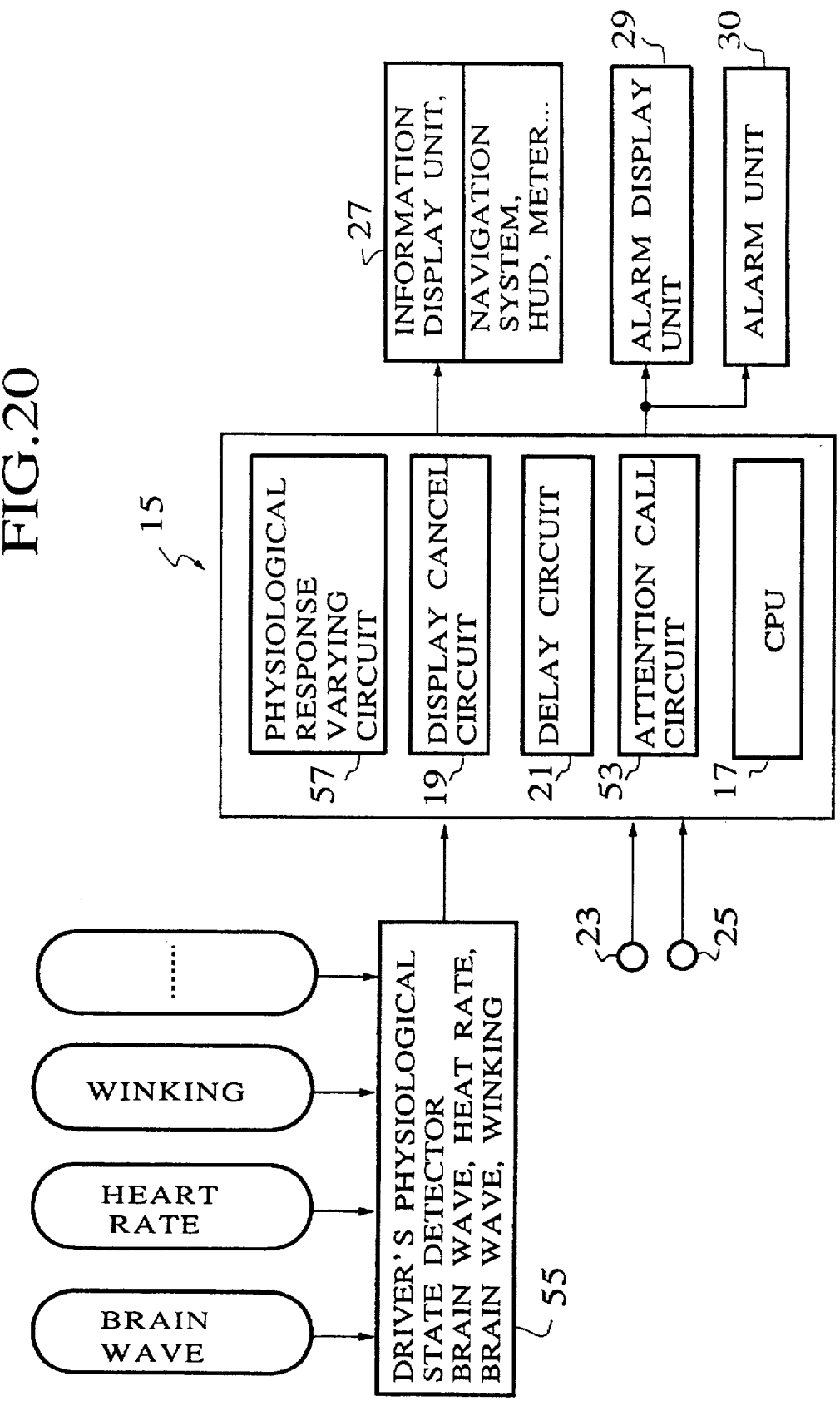

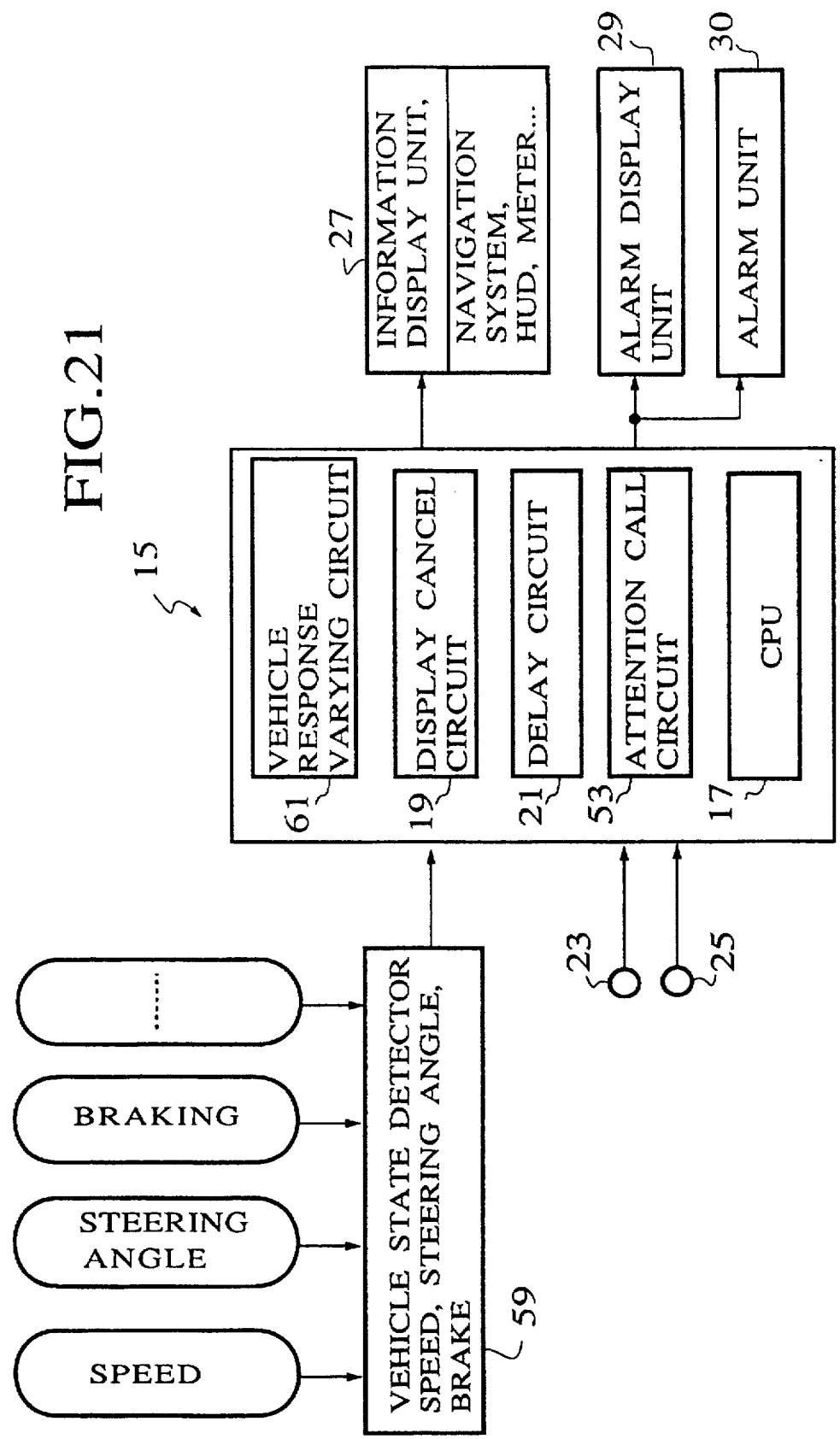

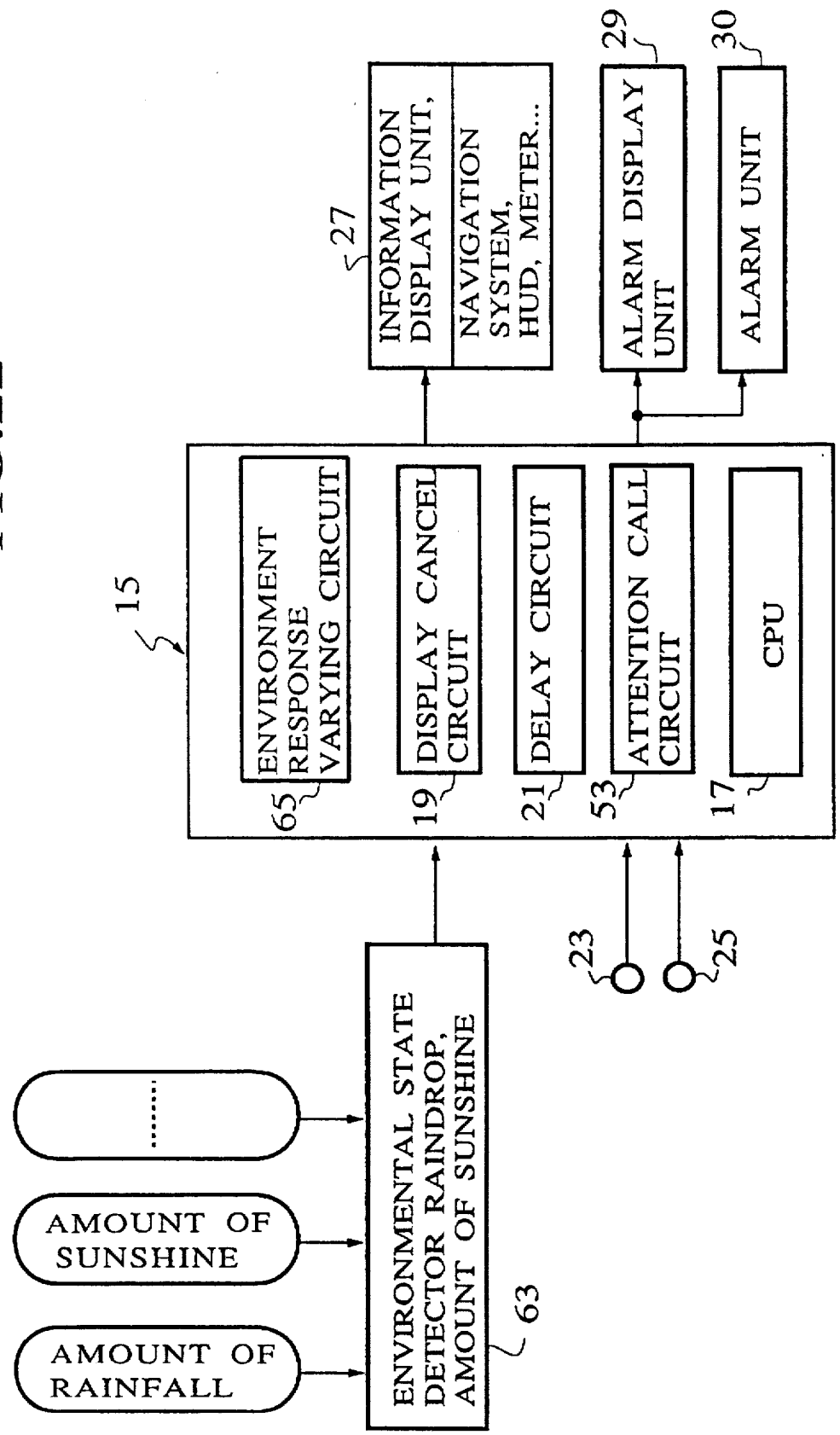

VEHICLE DISPLAY WHICH REDUCES DRIVER'S RECOGNITION TIME OF ALARM DISPLAY

BACKGROUND OF THE INVENTION

1. Field of the Invention

The present invention relates to a display device for a vehicle in which a recognition time for an alarm display can be shortened.

2. Description of Related Art

A vehicle speed display device as shown in FIG. 1 (as disclosed in Japanese Laid-open Utility Model Application No. Hei-6-16867) has been known as a conventional alarm display device for a vehicle. This speed display device is equipped with a speedometer 3 with which a speed signal from a speed signal converter 1 is displayed as an actual speed in an analog form. The speed display device is further equipped with an alarm display device 5 which is provided adjacent to the speedometer 3 and serves to alarm a driver with an alarm display (indication). The alarm display device 5 has a rotational drum 7 on which patterns, colors or the like are provided, and it is designed so that the driver can visually recognize variation of the pattern, color or the like on the rotational drum through a display window 9 by the rotation of the rotational drum 7. The rotational drum 7 is rotated by a motor 11, and a controller 14 for the motor 11 is supplied with a signal from a comparator 13. The comparator 13 is supplied with a signal representing an actual speed and a signal representing a preset limit speed 12 to compare these signals with each other, and then outputs a signal representing a comparison signal to the motor 14.

The speedometer 3 displays the actual speed in an analog form on the basis of the speed signal from the speed signal converter 1 at a vehicle running time. At this time, if the actual speed exceeds the limit speed, the motor 11 is driven in accordance with the signal from the comparator 13 to rotate the rotational drum 7, so that the driver can visually recognize the variation of the pattern or the color of the rotational drum through the display window 9. With this construction, the driver can recognize whether the actual speed is a safety speed.

The arrangement of both the speedometer and the alarm display as described above enables the driver to immediately check the alarm display in the vicinity of the speedometer 3 when the driver drives his vehicle by visually checking the speedometer 3. However, the driver mainly looks to the front beyond a windshield or the like (front look) when he drives his car, so that he does not necessarily pay his attention to the speedometer 3 at all times. Furthermore, there are some cases where he checks a display of a navigation system, an air conditioner or the like which is disposed at the front end portion side of a center console of the car. In such cases, if a target on which the driver (passenger) fixes his eyes (hereinafter referred to as "eye-fixed target") is the front beyond the windshield (i.e., front look) or the like and thus the driver's attention is far away from the alarm display device 5, it would take a long time from the start of the rotation of the rotational drum for the driver to perceive the variation of the alarm display due to the rotation of the rotational drum. In other words, a recognition time of the alarm display is long in the conventional display device. Therefore, a limit on time is imposed on perception of the alarm display.

SUMMARY OF THE INVENTION

An object of the prevent invention is to provide a display device for a vehicle in which the recognition time for an alarm display can be shortened irrespective of any target on which a driver fixes his eyes (driver's attention is fixedly paid).

In order to attain the above object, according to a first aspect of the present invention (claim 1), as shown in FIG. 2, a vehicle display device includes information display means CL1 for displaying prescribed information for a vehicle, alarm need state detection means CL2 for detecting a prescribed state where an alarm for the vehicle is needed, alarm display means C13 for performing an alarm display on the basis of the detection of the alarm need state detection means CL2, eye-fixed target detection means CL4 for detecting an object on which a driver fixes his eyes as an eye-fixed target, display cancel means for canceling the eye-fixed target or its neighboring information display, and delay means CL6 for controlling the alarm display means CL3 to perform the alarm display after a predetermined time lapse from the display cancellation of the display cancel means.

According to a second aspect of the present invention (claim 2), in the vehicle display device as described above (claim 1), the display cancel means is provided with attention call means for inducing a display variation to the eye-fixed target or its neighboring information display just before the display cancel means carries out its display cancellation.

According to a third aspect of the present invention (claim 3), in the vehicle display device as described above (claim 1 or 2), the delay means serves to alter the predetermined time to be delayed in accordance with urgency (emergency degree) of the alarm display.

According to a fourth aspect of the present invention (claim 4), the vehicle display device as described above (any one of claims 1 to 3) is provided with a driver's physiological state detection means for detecting the physiological state of a driver, and a physiology response varying means for varying at least one of the attention call means, the delay means and the alarm display means in accordance with the physiological state detected by the driver's physiological state detection means.

According to a fifth aspect of the present invention (claim 5), the vehicle display device as described above (any one of claims 1 to 4) is provided with vehicle state detection means for detecting a vehicle running state such as a running state where the vehicle runs at a corner or the like, and a vehicle response varying means for varying at least one of the attention call means, the delay means and the alarm display means.

According to a sixth aspect of the present invention (claim 6), the vehicle display device as described above (any one of claims 1 to 5) is provided with environmental state detection means for detecting an environmental state of the running vehicle such as a rainy weather, nighttime, dew, fog, a traffic jam or the like, and environment response varying means for varying at least one of the attention call means, the delay means and the alarm display means.

According to a seventh aspect of the present invention (claim 7), in the vehicle display device as described above (any one of claims 2 to 6), the attention call means performs at least one of variation of brightness, variation of color, variation of size and turning on-and-off of the eye-fixed target or its neighboring information display.

According to an eighth aspect of the present invention (claim 8), in the vehicle display device as described above (any one of claims 1 to 7), the alarm display means can change the position of the alarm display in accordance with variation of an eye-fixed target, and it is provided with alarm display position altering means for altering the position of the alarm display in accordance with the variation of the eye-fixed target.

According to a ninth aspect of the present invention (claim 9), in the vehicle display device as described above (claim 8), the alarm display means changes the alarm display position in accordance with the emergency degree.

According to a tenth aspect of the present invention (claim 10), in the vehicle display device as described above (claim 9), when the eye-fixed target is a meter cluster or a navigation system, the alarm display means displays on a head-up display an alarm whose emergency degree is not so high, and displays within the eye-fixed target an alarm whose emergency degree is high.

According to an eleventh aspect of the present invention (claim 11), in the vehicle display device as described above (claim 8), when the eye-fixed target is a speedometer of the meter cluster, the display cancel means displays a speed on the head-up display just after a speedometer display is canceled.

According to a twelfth aspect of the present invention (claim 12), in the vehicle display device as described above (any one of claims 1 to 11), the display cancel means cancels display of information other than the alarm display or reduce display brightness when the eye-fixed target is canceled.

According to a thirteenth aspect of the present invention (claim 13), in the vehicle display device as described above (any one of claims 1 to 12), the eye-fixed target detection means comprises a line-of-sight detection device.

According to a fourteenth aspect of the present invention (claim 14), in the vehicle display device as described above (any one of claims 1 to 12), the eye-fixed detection means judges, as an eye-fixed target, an information display just before a switch-on operation by a driver (passenger).

According to a fifteenth aspect of the present invention (claim 15), in the vehicle display device as described above (any one of claims 1 to 12), the eye-fixed target detection means detects, as an eye-fixed target, an information display of the information display means which corresponds to an operation of a driver. The delay means sets a predetermined time for an alarm display whose emergency degree is not high, whereas it does not set a predetermined time for an alarm display whose emergency degree is high. The alarm display means displays the alarm display whose emergency degree is not high after the operation of the driver is completed, whereas it displays the alarm display of high emergency degree within the information display during the operation of the driver.

According to the first aspect of the presents invention, various information for a vehicle such as a vehicle speed, a residual fuel amount, etc. can be displayed by the information display means CL1. Furthermore, in a prescribed state where an alarm is needed for the vehicle, for example, when a vehicle speed exceeds a safety speed, a state where the residual fuel amount is less than a predetermined amount, etc. can be detected by the alarm need state detection means CL2. On the basis of the detection of the alarm need state detection means CL2, the alarm display means CL3 carries out a prescribed alarm display. For the alarm display of the alarm display means CL3, an object in the information display means CL1 on which the driver fixes his eyes as an eye-fixed target is detected by the eye-fixed target detection means CL4, and subsequently the display of the eye-fixed target of the information display means CL1 is canceled on the basis of the detection of the alarm need state detection means CL2 by the display cancel means CL5. Thereafter, the delay means CL6 allows the alarm display means CL3 to perform its alarm display after a predetermined time lapse from the display cancel operation of the display cancel means CL5. That is, when the alarm display is carried out, the information display of the eye-fixed target is first temporarily canceled, and after the predetermined time elapses from the cancel of the information display, the alarm display is started. Accordingly, the line-of-sight of the driver can be smoothly shifted to the alarm display after it is released from the eye-fixed target.

According to the second aspect of the present invention, in addition to the action of the first aspect (claim 1) as described above, the display variation can be provided to the eye-fixed target by the attention call means just before the display cancellation is performed by the display cancel means. Accordingly, the release of the line-of-sight of the driver (passenger) from the eye-fixed target can be more smoothly performed.

According to the third aspect of the present invention, in addition to the action of the first (claim 1) or second (claim 2) aspect as described above, the predetermined time from the display cancellation until the alarm display can be varied in accordance with the emergency degree of the alarm display by the delay means.

According to the fourth aspect of the present invention, in addition to the action of any one of the first to third aspects (claim 1 to claim 3) as described above, a physiological state of the driver, for example, brain wave, heart rate or the like of the driver is detected by the driver's physiological state detection means, and the physiology response varying means varies at least one of the attention call means, the delay means and the alarm display means on the basis of the detected physiological state. Accordingly, greater attention can be called in accordance with the driver's physiological state.

According to the fifth aspect of the present invention, in addition to the action of any one of the first to fourth aspects (claims 1 to 4) as described above, a vehicle running state such as a vehicle speed, a curve running or the like is detected by the vehicle state detection means, and at least one of the attention call means, the delay means and the alarm display means is variable in accordance with the detected vehicle state by the vehicle response varying means. Accordingly, greater attention calling or the like can be enabled in accordance with the vehicle running state.

According to the sixth aspect of the present invention, in addition to the action of any one of the first to fifth aspects (claims 1 to 5) as described above, the vehicle running environmental state such as a rainy weather, nighttime, dew, fog, traffic jam or the like can be detected by the environmental state detection means, and at least one of the attention call means, the delay means and the alarm display means can be varied in accordance with the detected vehicle running environmental state by the environment response varying means. Accordingly, greater attention call or the like can be enabled in accordance with the vehicle running environmental state.

According to the seventh aspect of the present invention, in addition to the action of any one of the second to sixth aspects (claims 2 to 6), the attention call of the attention call means as described above is performed by at least one of variation of brightness, variation of color, variation of size and turning on-and-off of the information display. Accordingly, the attention call can be performed by visual stimulation.

According to the eighth aspect of the present invention, in addition to the action of any one of the first to seventh aspects (claims 1 to 7) as described above, the alarm display means can vary the alarm display position in accordance with the eye-fixed target. Accordingly, the alarm display can be performed to meet the position of the line-of-sight of the driver (passenger).

According to the ninth aspect of the present invention, in addition to the action of the first to eighth aspect (claims 1 to 8) as described above, the alarm display means can vary the alarm display position in accordance with the emergency degree (degree of urgency) of the alarm display. Accordingly, the alarm display position can be matched to the line-of-sight of the driver in accordance with the emergency degree.

According to the tenth aspect of the present invention, in addition to the action of the ninth aspect (claim 9) as described above, when the eye-fixed target is within a meter cluster or it is a navigation system, an alarm display (indication) of low emergency degree (hereinafter referred to as "low-emergency alarm display") is displayed on a head-up display, and an alarm display (indication) of high emergency degree (hereinafter referred to as "low-emergency alarm display") is displayed within the eye-fixed target. With this operation, the alarm display can be set onto the line-of-sight of the driver even when the driver looks at the meter cluster or navigation system.

According to the eleventh aspect of the present invention, in addition to the action of the eighth aspect (claim 8) as described above, when the eye-fixed target is a speedometer in the meter cluster, the display cancel means displays a speed on the head-up display just after canceling the display on the speedometer. Accordingly, the display can be maintained.

According to the twelfth aspect of the present invention, in addition to the action of any one of the first to eleventh aspects (claims 1 to 11) as described above, the display cancel means can cancel information display other than the alarm display or reduce the brightness of the information display when canceling the eye-fixed target. Accordingly, the alarm display can be made remarkable.

According to the thirteenth aspect of the present invention, in addition to the action of any one of the first to twelfth aspects (claims 1 to 12) as described above, a line-of-sight detection device can be used as the eye-fixed detection means. Accordingly, the eye-fixed target can be detected by detecting the line-of-sight of the driver.

According to the fourteenth aspect of the present invention, in addition to the action of any one of the first to twelfth aspects (claims 1 to 12) as described above, the information display just after the switch-on operation of the driver (passenger) can be judged as the eye-fixed target. That is, the eye-fixed target can be detected using a signal representing the switch-on operation.

According to the fifteenth aspect of the present invention, in addition to the action of any one of the first to twelfth aspects (claims 1 to 12) as described above, the eye-fixed target detection means detects, as an eye-fixed target, the information display of the information display means in accordance with the operation of the driver. The delay means sets a predetermined time for a low-emergency alarm display, but it does not set a predetermined time for a high-emergency alarm display. The alarm display means displays the low-emergency alarm display at a portion other than the information display, and displays the high-emergency alarm display within the information display.

Accordingly, the information display which is based on the operation of the driver is detected as an eye-fixed target, and the low-emergency alarm display is displayed when a predetermined time elapses after the eye-fixed target is canceled while the high-emergency alarm display can be displayed within the information display just after the eye-fixed target is canceled.

BRIEF DESCRIPTION OF THE DRAWINGS

FIG. 6 is a diagram showing an analyzed image;

FIG. 7 is a diagram showing an eye-fixed target;

FIG. 20 is a block diagram showing a fourth embodiment of the vehicle display device according to the present invention;

FIG. 21 is a block diagram showing a fifth embodiment of the vehicle display device according to the present invention;

FIG. 22 is a block diagram showing a sixth embodiment of the vehicle display device according to the present invention;

DETAILED DESCRIPTION OF THE PREFERRED EMBODIMENTS

Preferred embodiments according to the present invention will be described hereunder with reference to the accompanying drawings.

Figure 3:
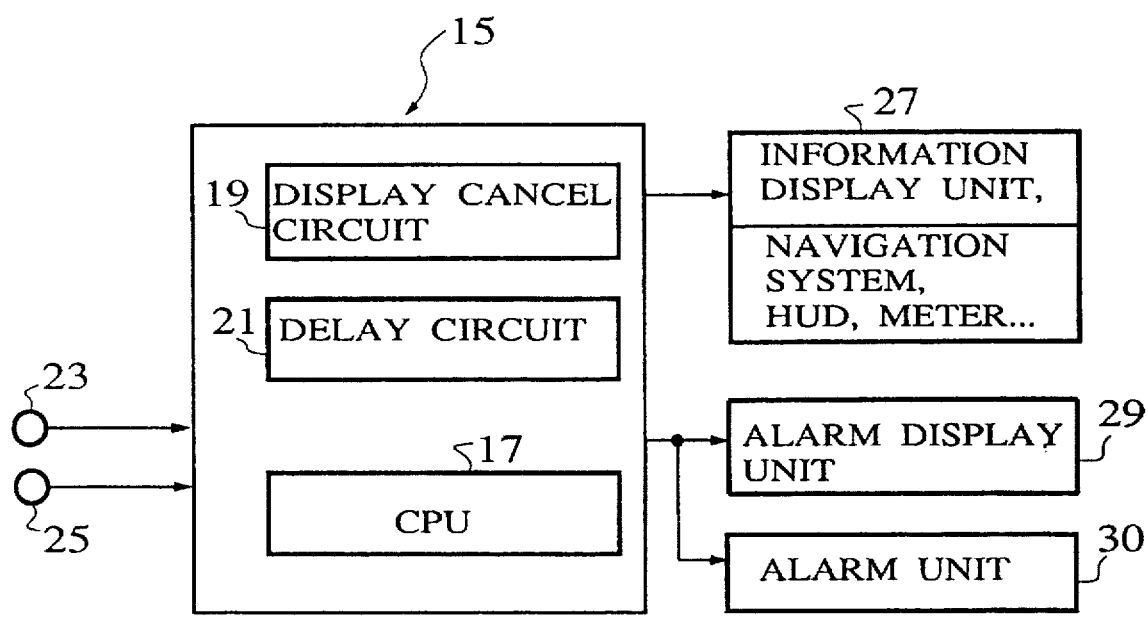
FIG. 3 is a block diagram showing a first embodiment of the vehicle display device according to the present invention.

FIG. 3 is a block diagram showing the whole construction of a first embodiment of a display device for a vehicle according to the present invention.

The vehicle display device of the first embodiment shown in FIG. 3 has a controller 15 comprising a microcomputer. The controller 15 includes a CPU 17, an interface and other units (not shown), a display cancel circuit 19, and a delay circuit 21, and it is supplied with signals from an alarm need state detection unit 23 and a line-of-sight detection unit 25. Furthermore, the controller 15 outputs signals to an information display unit 27, an alarm display unit 29 and an alarm unit 30.

Figure 2:
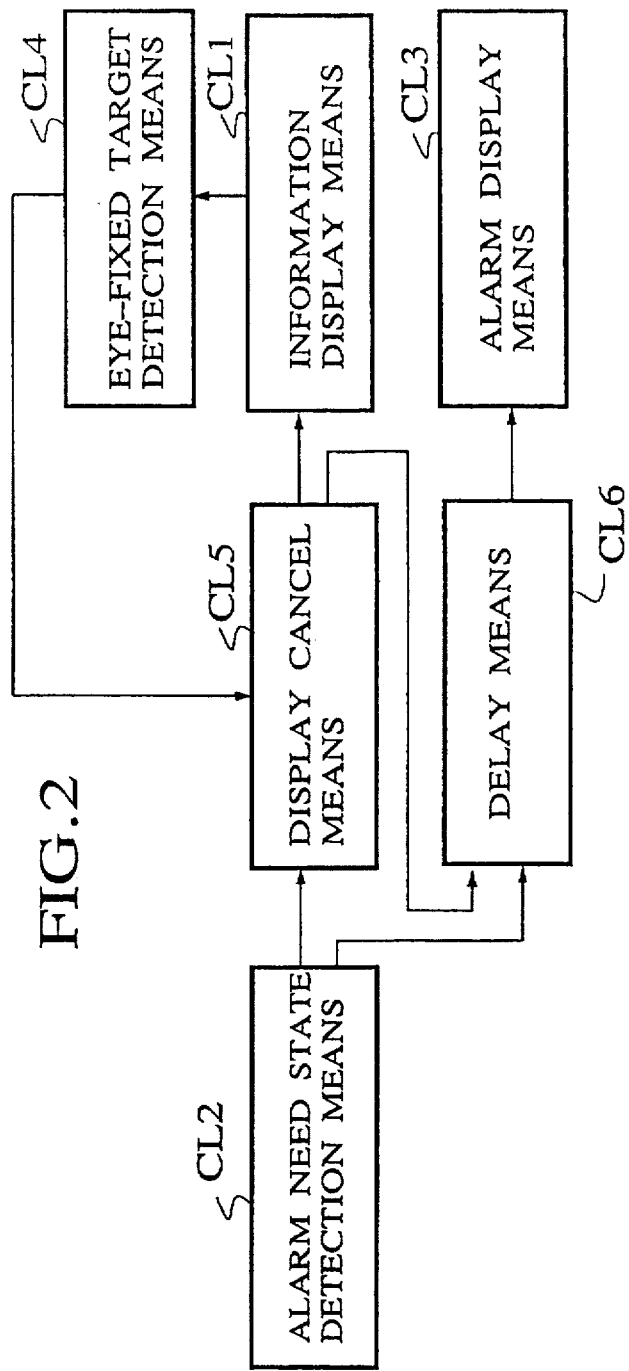
FIG. 2 is a block diagram showing the basic concept of a display device for a vehicle according to the present invention.

The information display unit 27 constitutes the information display means CL1 (see FIG. 2) for displaying prescribed information of a vehicle. Various kinds of information are usable as the prescribed information of a vehicle, and a speed meter display 33 which is electrically displayed on a meter cluster 31, an engine rotational number display 35 and a map information display (not shown) which is performed by a navigation system 37 are representatively illustrated in FIG. 4.

The alarm need state detection device shown in FIG. 3 constitutes the alarm need state detection means CL2 (see FIG. 2) for detecting a prescribed vehicle state where an alarm is needed for the vehicle. Various states are considered as the prescribed state needing the alarm. In this embodiment, it is assumed that a vehicle state where the vehicle is excessively near to a pedestrian is detected. Accordingly, the alarm need state detection unit 23 comprises an ultrasonic sensor or the like.

Figure 1:
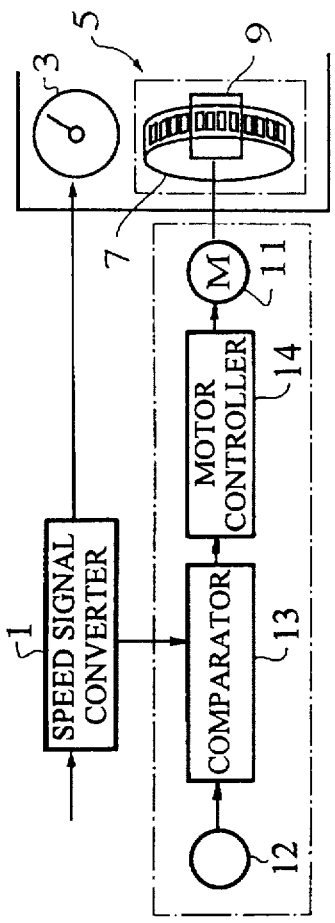
FIG. 1 is a block diagram showing a conventional display device for a vehicle.
Figure 4:
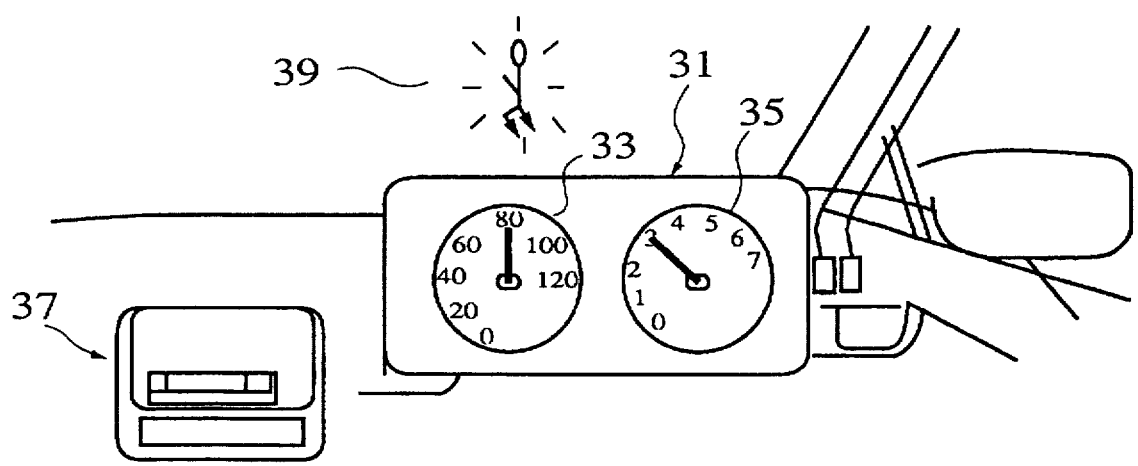
FIG. 4 is a block diagram showing a center console and its surroundings containing information display means, etc. in the vehicle display device of the first embodiment.

The alarm display unit 29 constitutes the alarm display means CL3 (see FIG. 1), and it serves to perform an alarm display on the basis of the detection of the alarm need state detection unit 23. Various kinds of display (indication) such as a picture, a character, etc. may be used as the alarm display. In FIG. 4, a pedestrian approach information display 39 by a head-up display (hereinafter referred to as "HUD") is illustrated as an example.

Figure 5:
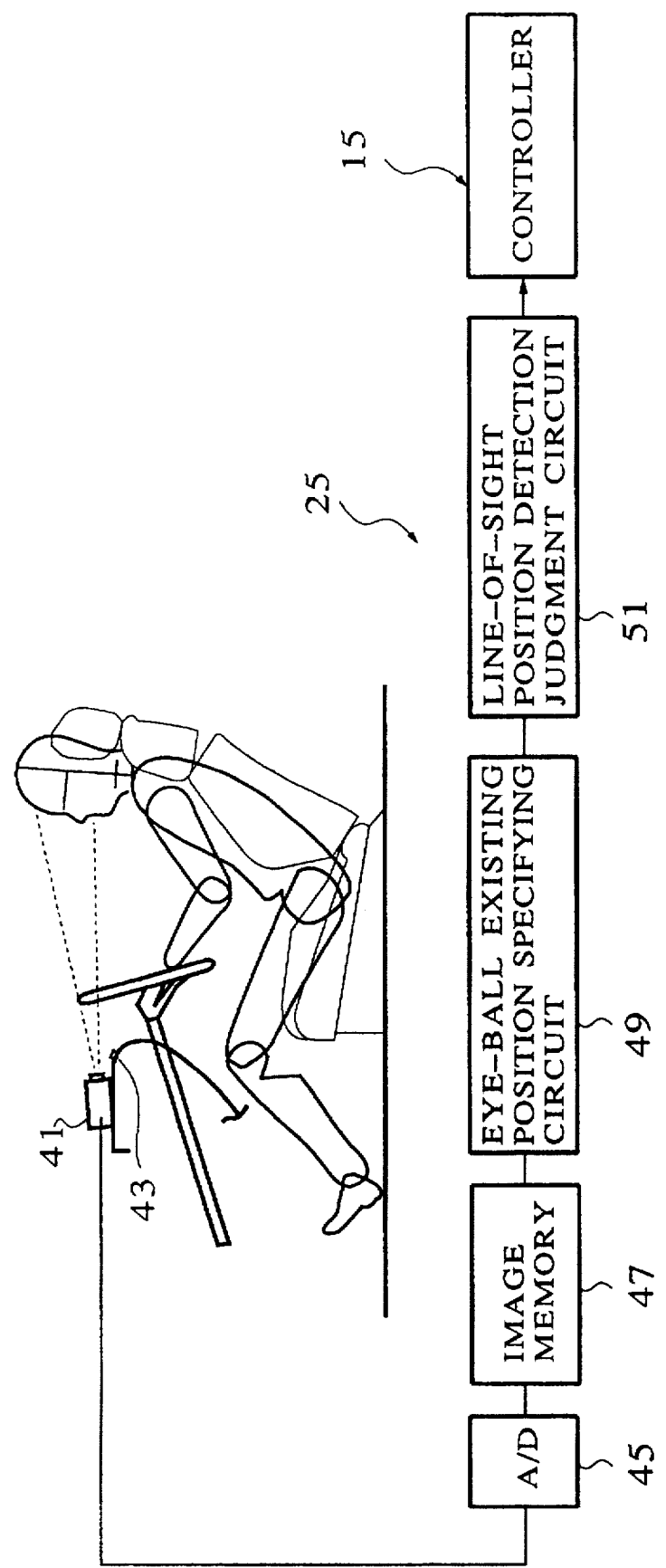
FIG. 5 is a block diagram showing eye-fixed target detection means.

The line-of-sight detection unit 25 constitutes the eye-fixed target detection means CL4 (see FIG. 2), and it serves to detect an object on which a driver fixes his eyes as an eye-fixed target in the information display unit 27 or the like. This embodiment uses a line-of-sight detection unit 25 shown in FIG. 5.

The line-of-sight detection unit 25 is equipped with an eye camera 41. The eye camera 41 is mounted to an instrument 43 of the vehicle, for example. The eye camera 41 outputs a signal in accordance with the motion of driver's eye. The signal from the eye camera 41 is supplied to an A/D converter 45, then passed through an image memory 47, an eye-ball existing position specifying circuit 49, a line-of-sight position detection and judgment circuit 51 in this order and then input to the controller 15.

The eye camera 41 emits light to the driver's face to obtain a driver's face (eye) image, and inputs the driver's face (eye) image information through the A/D converter 45 into an image memory 47 in synchronism with the light emission to the driver's face. The image memory 47 outputs the driver's face image to the eye-ball existing position specifying circuit 49 as mode gradation information. In the eye-ball existing position specifying circuit 49, the density of each of picture elements which are located in two predetermined areas (eye areas) of the input driver's face image is detected, and the number of picture elements whose density is not less than a predetermined value (threshold density value) is counted. On the basis of the count value, it is judged whether the brightness of the input image is ununiform, thereby specifying existing areas of the driver's eye-balls. The specification of the two predetermined areas is carried out as follows. That is, if the brightness of the input image is judged not to be ununiform, the whole face image is set as an eye-ball search range, and if the brightness of the input image is judged to be ununiform, only one side of the face image is set as an eye-ball search range.

Subsequently, in the line-of-sight position detection and judgment circuit 51, an object on which the driver fixes his eyes (i.e., an eye-fixed target) is determined on the basis of an judgment as to where the iris of the eye of the driver locates in the eye area. In this case, variation of the line-of-sight of the driver, motion of driver's head and the difference of body structure may be considered.

FIG. 6 shows an output image of the image memory 47.

FIG. 7 shows the relationship between the eye-ball position and the line-of-sight. For example, in FIG. 7, (a) is judged to correspond to a case where the driver fixes his eyes on the front (front look), (b) is judged to correspond to a case where the driver fixes his eyes on HUD (head-up display), (c) is judged to correspond to a case where the driver fixes his eyes on a center cluster, (d) is judged to correspond to a case where the driver fixes his eyes on a meter cluster, (e) is judged to correspond to a case where the driver looks aside and (f) is judged to correspond to a case where the driver dozes off.

The display cancel circuit 19 of FIG. 3 constitutes the display cancel means CL5 (see FIG. 2), and it serves to cancel the information display of the eye-fixed target of the driver on the basis of the detection of the alarm need state detection unit 23.

The delay circuit 21 of FIG. 3 constitutes the delay means CL6 (see FIG. 2), and it serves to allow the alarm display after a predetermined time elapses from the display cancellation of the display cancel circuit 19.

Next, the operation of the vehicle display device of this embodiment will be described with reference to a control flowchart of FIG. 8.

Figure 8:
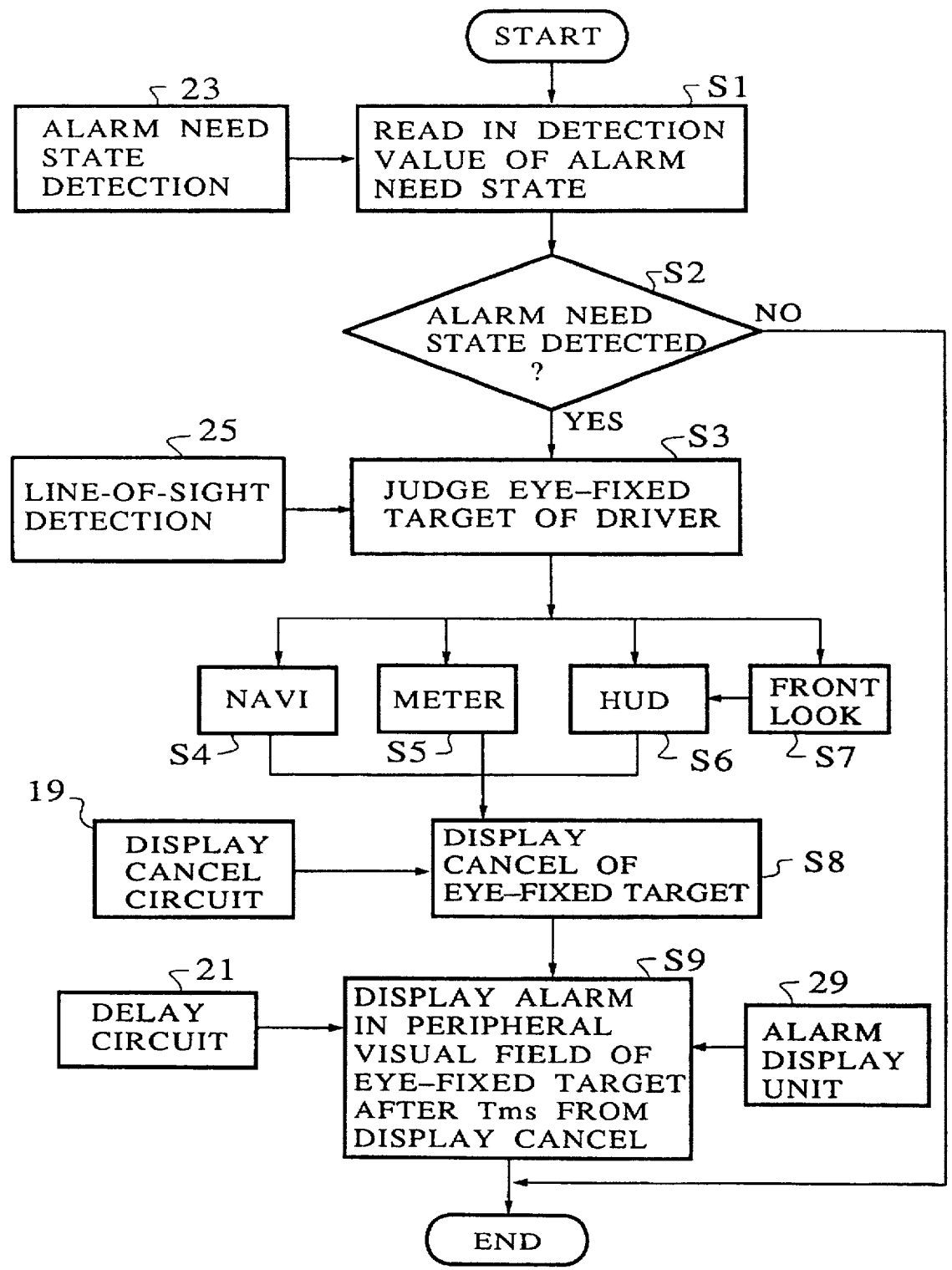
FIG. 8 is a flowchart for the first embodiment.

Upon execution of the flowchart of FIG. 8, an alarm need state detection value is first read in in step S1. The read-in is performed on the basis of a signal from the alarm need state detection unit 23. In this case, the alarm need state detection value is assumed to represent whether a pedestrian approaches to the vehicle at the front side of the vehicle.

It is judged in step S2 whether an alarm need state is detected. If no alarm need state is detected, the judgment in step S2 is "NO" because no alarm is needed, and then the program of this flowchart is ended. On the other hand, if an alarm need state is detected, the judgment in step S2 is "YES", and the program goes to step S3.

In step S3, an eye-fixed target of the driver is judged. This judgment is performed on the basis of a signal from the line-of-sight detection unit 25. For example, it is judged whether the driver looks at a navigation system, a meter cluster, HUD or the front of the vehicle. If the eye-fixed target is the navigation system (i.e., the driver fixes his eyes on the navigation system), a judgment in step S4 would be made. If the eye-fixed target is the meter cluster, an judgment in step S5 would be made. If the eye-fixed target is the HUD, a judgment in step S6 would be made. If the driver fixes his eyes on the front, a judgment in step S7 is made. When the driver fixes his eyes on the front, the driver looks at the front side beyond the windshield similarly in the case where he looks at the HUD, and thus the judgment in step S7 is contained in the step S6.

After this judgment, the eye-fixed target is canceled (deleted) in step S8. This display cancellation is performed on the basis of an output signal from the display cancel circuit 19. Subsequently, in step S9, an alarm display is performed within a field of view around the eye-fixed target (hereinafter referred to as "peripheral visual field") when a predetermined time (delay time) Tms elapses after the display of the eye-fixed target is canceled. The alarm display is performed on the basis of the alarm display unit 29, and the delay time Tms is determined on the basis of the output of the delay circuit 21. Accordingly, when there occurs a case where an alarm is needed, information on a driver's eye-fixed target at that time is canceled, an alarm display indicating that a pedestrian approaches to the vehicle can be performed after the delay time Tms from the display cancellation of the eye-fixed target.

Figure 9:
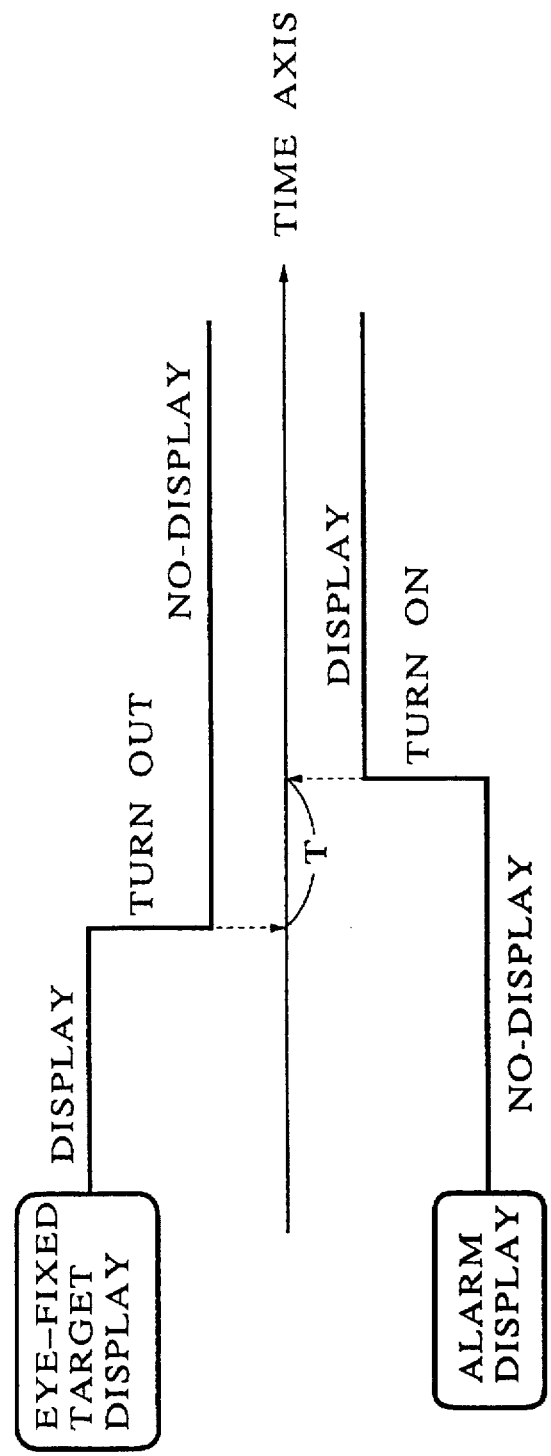
FIG. 9 is a time chart for the first embodiment.

FIG. 9 is a time chart for the vehicle display device of this embodiment. In FIG. 9, a time axis is illustrated at the center in the vertical direction, an eye-fixed target display is illustrated at the upper side of the time axis, and an alarm display is illustrated at the lower side of the time axis. In this case, the alarm display is performed (turned on) after a time lapse of T=200 to 250 ms from the display cancellation (turn-out) of the eye-fixed target display as shown in the time chart.

Figure 10A:
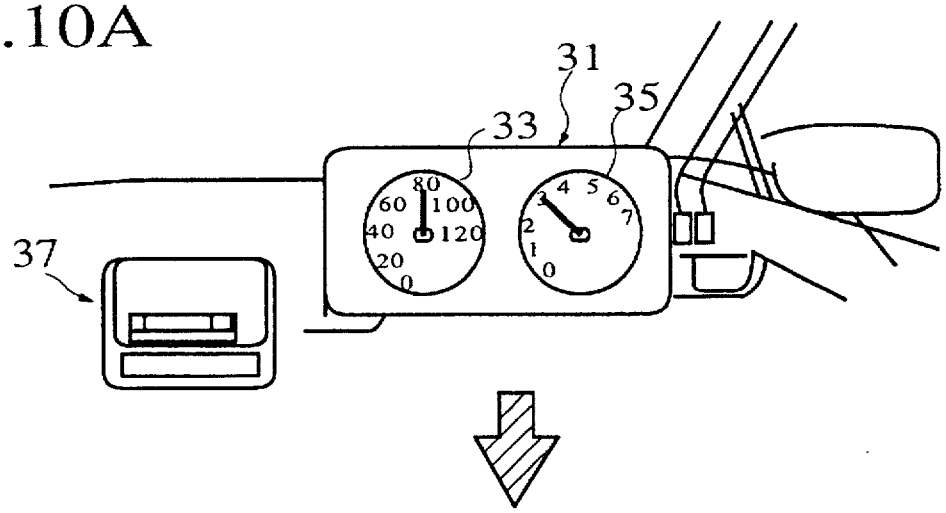
FIGS. 10A to 10C are diagrams showing an operation of the vehicle display device of the first embodiment.
Figure 10B:
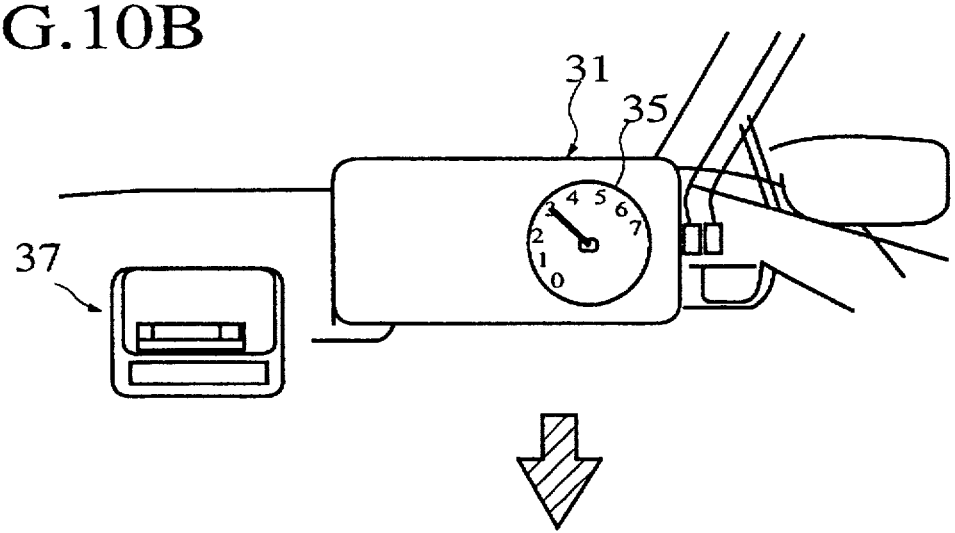
Figure 10C:
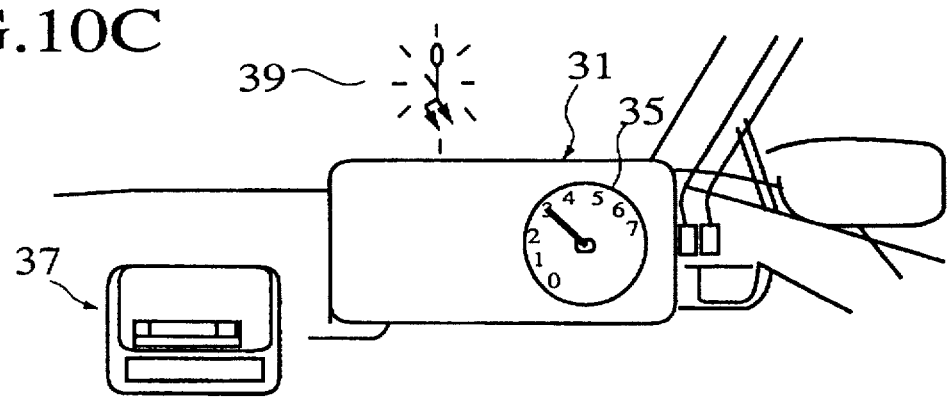

FIGS. 10A to 10C show an alarm display in a case where the driver's eye-fixed target is a speedometer display 33. It is assumed that the driver fixes his eyes on the meter cluster 31, particularly the speedometer display 33 as shown in FIG. 10A and at this time an alarm is needed because a pedestrian exists at the front side of the vehicle. In this case, the speedometer display 33 which is the driver's eye-fixed target is first specified. Subsequently, the speedometer display is canceled as shown in FIG. 10B. After the delay time Tms, a pedestrian approach information display 39 is displayed as the alarm display on the HUD as shown in FIG. 10C.

As described above, if the eye-fixed target display is canceled as shown in FIG.10B in order to perform the pedestrian approach information display 39 as the alarm display as shown in FIG. 10C, a recognition time required from the time when the pedestrian approach information display 39 is started until the time when the driver recognizes it can be extremely shortened even when the driver fixes his eyes on the speedometer display 33 as shown in FIG. 10A. Therefore, the driver can take a next action, for example, a braking action more quickly.

This operation is introduced on the basis of the knowledge on visual psychology which is called as "Express Attentional Shift". That is, according to the knowledge of the visual psychology, it is proved that when an eye-fixed point is temporarily deleted under a specific condition and then a target is displayed within a peripheral visual field of the eye-fixed point after a constant time (about 200 to 250 ms) elapses, the target can be more quickly perceived.

Figure 11:
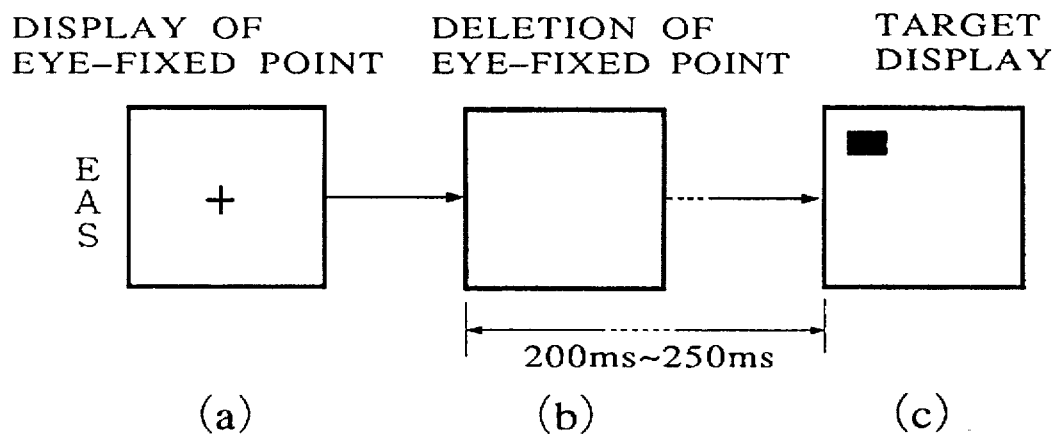
FIG. 11 is an explanatory diagram for EAS.

FIG. 11 shows an experiment result of EAS. The experiment is performed as follows. Various targets whose shape, location place, color, etc. are different from one another are displayed on a CRT, and a subject is asked to discriminate these targets from one another or indicate a simple property of each target. Through this experiment, a discrimination (detection) speed is measured. That is, an eye-fixed point (represented by + sign) is displayed on the CRT as shown in (a), and then the eye-fixed point display is canceled as shown in (b). After a delay time T=200 to 250 ms elapses from the display cancellation of the eye-fixed point, a target (represented by a black rectangle) is displayed on the CRT as shown in (c).

Figure 12:
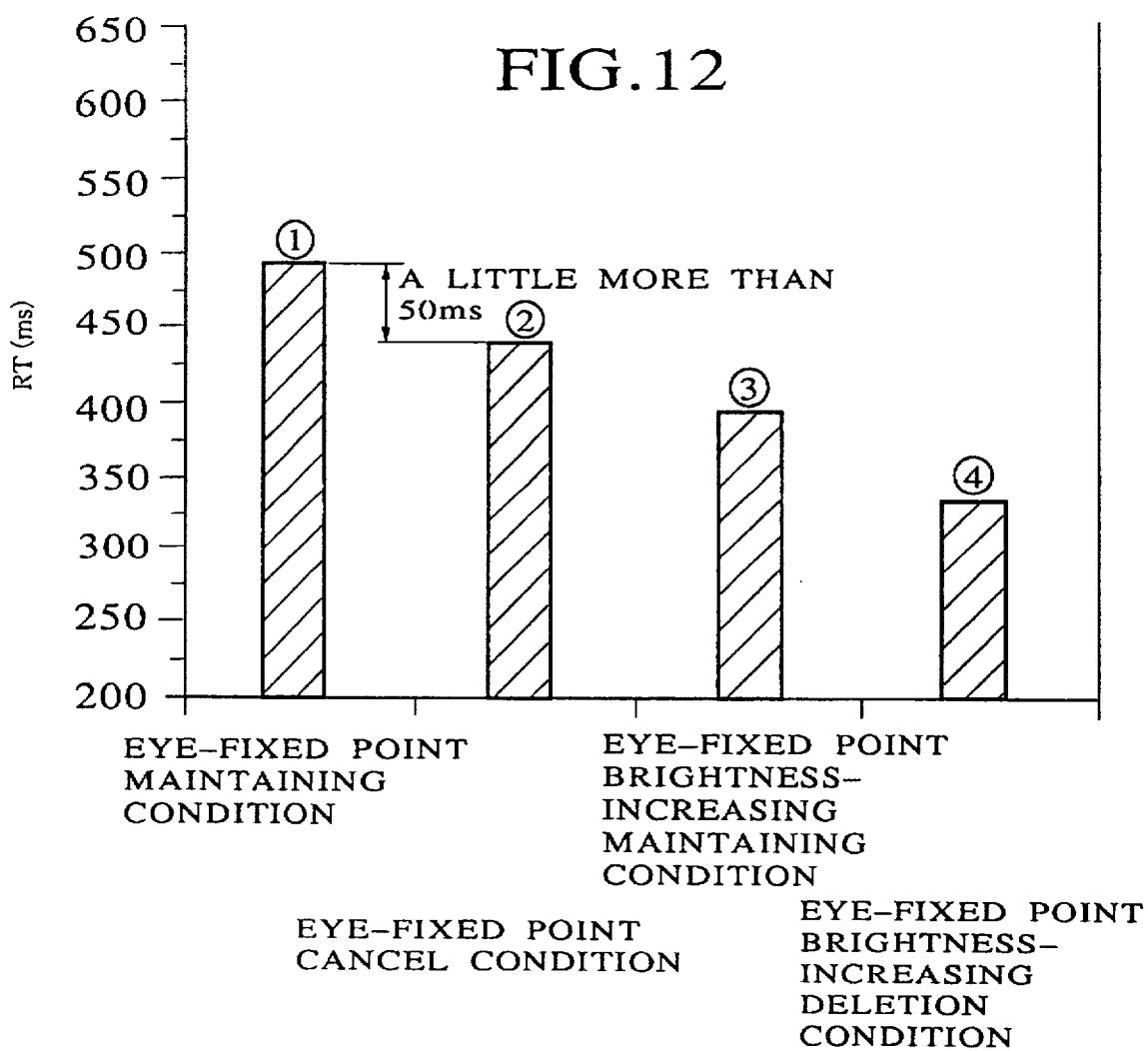
FIG. 12 is a graph showing an experimental result of EAS and SEAS.

The experiment results which were obtained through the experiment as described above are shown in FIGS. 12 and 13. In FIG. 12, the axis of ordinate represents a reaction time RTms. The reaction time is defined as a time period from the time when the target display is started until the time when the subject recognizes the target. Experiment results (1) to (4) which were obtained under various different conditions in FIG. 12, and only the experiment results (1) and (2) are considered below. The experiment results (3) and (4) will be described later.

In FIG. 12, (1) represents the experiment result under an eye-fixed point maintaining condition, and (2) represents the experiment result under an eye-fixed point delete condition. The eye-fixed point maintaining condition is defined as a condition under which the eye-fixed point shown in (b) of FIG. 10 is not deleted for a time period from the time when the eye-fixed point display of (a) of FIG. 10 is started until the time when the target display of (c) of FIG. 10 is started. The eye-fixed point delete condition is defined as a condition under which the deletion of the eye-fixed point of (b) of FIG. 10 is performed. As apparent from comparison between the experiment results (1) and (2), the reaction time of the experiment result (2) is about 450 ms whereas that of the experiment result (1) is about 500 ms, and thus the reaction time of (2) is shorter than that of (1) by about 50 ms.

Figure 13:
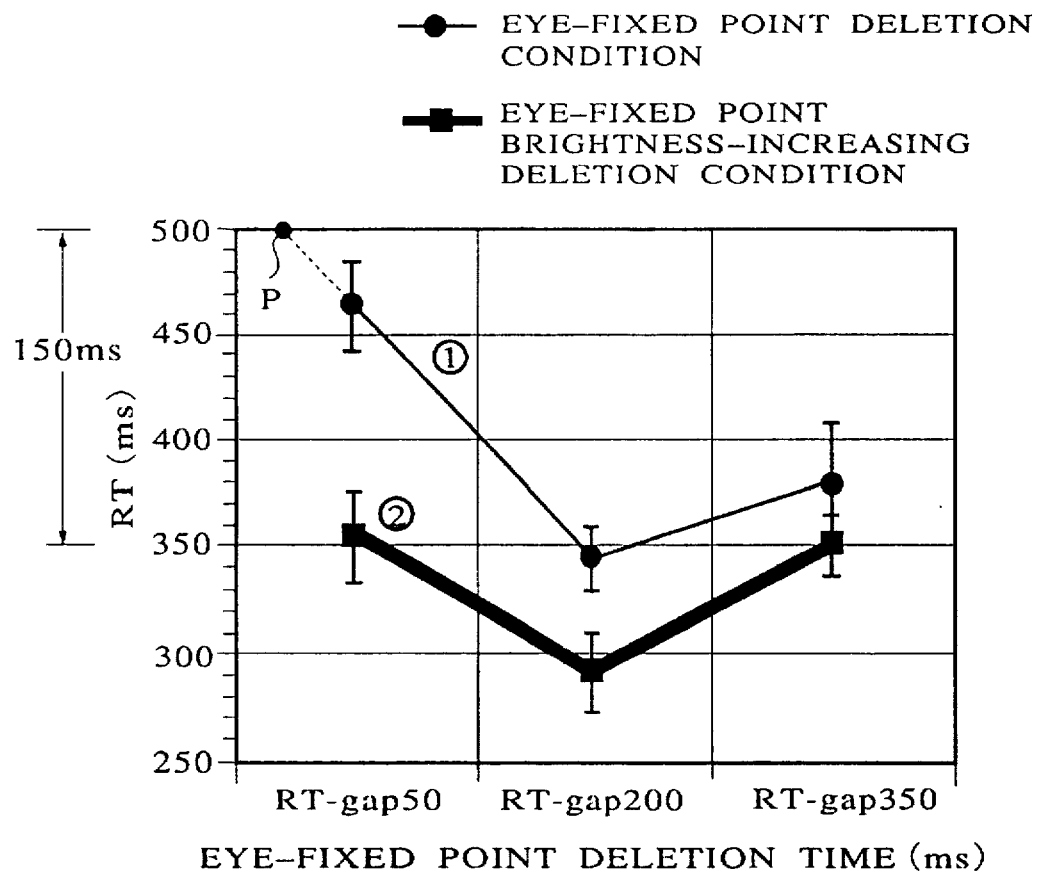
FIG. 13 is a graph showing an experiment result of EAS and SEAS.

FIG. 13 is a graph showing a comparison result of reaction time under the eye-fixed point deletion condition (2) between a case where the target display is performed just after the eye-fixed point is deleted and a case where the target display is performed after a predetermined time T=200 ms elapses from the deletion of the eye-fixed point. In this case, the time condition of T=200 ms (delay time) for comparison is used for the following reason.

In FIG. 13, the axis of ordinate represents a reaction time Rt, and the axis of abscissa represents a delay time T. That is, the target display is performed after a delay time T elapses from the deletion of the eye-fixed point. In the graph of FIG. 13, 50 mm, 200 mm and 350 mm are used as the delay time. That is, FIG. 13 shows the experiment result of the reaction time with variation of the delay time T (50, 200 and 350 mm). As is apparent from the graph of FIG. 13, the reaction time is shortest at T=200 ms.

In FIG. 13, only the experiment result (1) under the eye-fixed point deletion condition is considered, and the experiment result (2) will be described later.

If those experiment result points (●) which are plotted on the graph of FIG. 13 are connected to each other with a broken line and then the broken line is extended (at the left side of the graph) as indicated by a chain line, a reaction time RT at T=0 can be estimated. That is, in FIG. 13, a point P represents a case where the delay time T is equal to substantially zero, and the reaction at this time is estimated as RT=500 ms.

From the experiment result of FIG. 13, it is apparent that there is the time difference of RT=150 ms between the case where the target display is performed just after the eye-fixed point deletion and the case where the target display is performed after the lapse of 200 ms from the eye-fixed point deletion. Accordingly, as is apparent from comparison between the experiment result under the eye-fixed point maintaining condition ((1) of FIG. 12) and the experiment result under the eye-fixed point deletion condition where the target display is performed after T=200 ms elapses ((1) of FIG. 13), the reaction time of the latter is shorter than that of the former by the sum of the time different of 50 ms (obtained in FIG. 12) and the time difference of 150 ms (obtained in FIG. 13), that is, by 200 ms. That is, as compared with a normal operation of merely performing the target display, the EAS can increase the recognition speed of the target by about 200 ms.

Accordingly, if the alarm display is performed after the predetermined time elapses from the deletion of the eye-fixed point as shown in FIGS. 10A to 10C, the alarm display (the pedestrian approach information display 39 in this embodiment) can be recognized more quickly by about 200 ms than the case where no eye-fixed point deletion is performed. Accordingly, the driver can recognize more quickly an alarm display due to approach of a pedestrian to a vehicle, a bad condition of an engine, etc., so that the driver can take a suitable action such as a braking work or the like more quickly.

Next, a second embodiment of the vehicle display device according to the present invention will be described hereunder. The same elements as the first embodiment are represented by the same reference numerals, and the duplicate description thereof is omitted.

Figure 14:
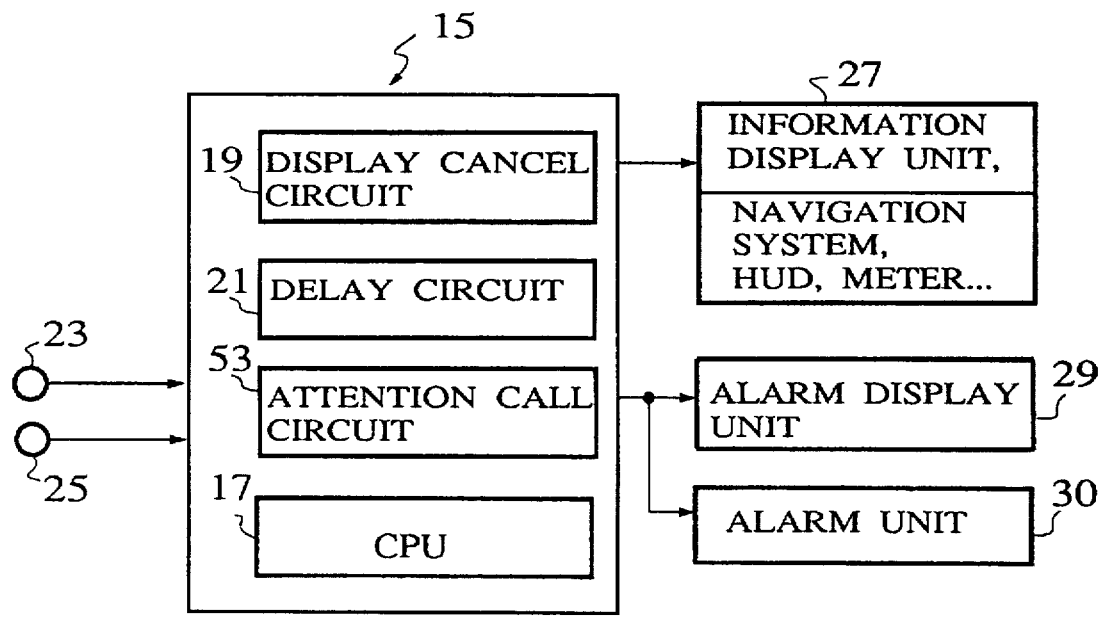
FIG. 14 is a block diagram showing a second embodiment of the vehicle display device according to the present invention.

FIG. 14 is a block diagram showing a second embodiment of the vehicle display device according to the present invention. In this embodiment, the information display of an eye-fixed target is subjected to a display variation just before the information display is canceled. Accordingly, in this embodiment, an attention call circuit 53 constituting the attention call means is provided.

Figure 15:
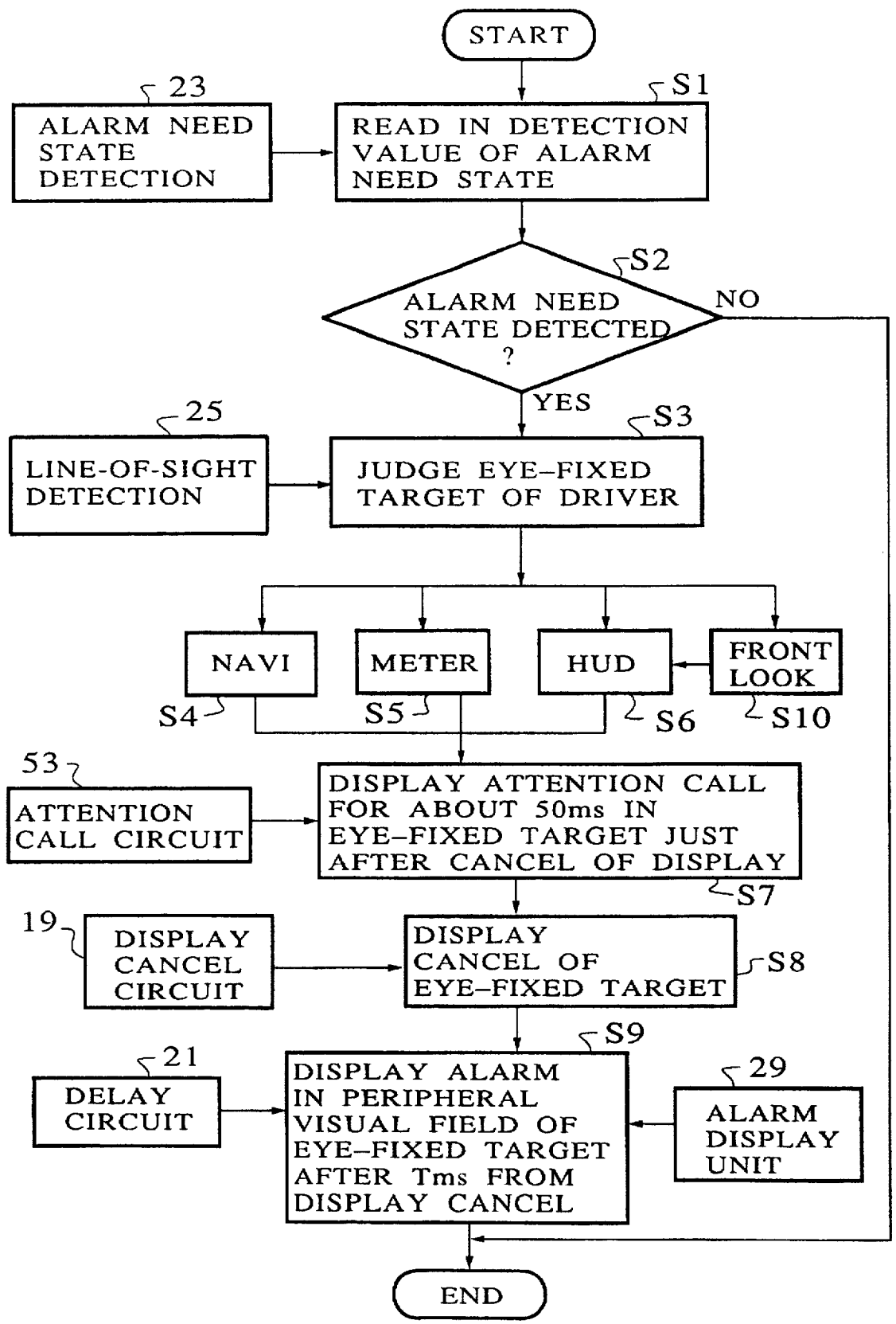
FIG. 15 is a flowchart for the second embodiment.

FIG. 15 is a flowchart for the second embodiment of the vehicle display device according to the present invention. The steps of this embodiment are basically identical to the steps of the first embodiment shown in FIG. 8 except that step S10 is newly added, and the same steps as the first embodiment are represented by the same reference numerals. In step S10, an attention call display is performed for about 50 ms just before an eye-fixed target display is canceled.

Figure 16:
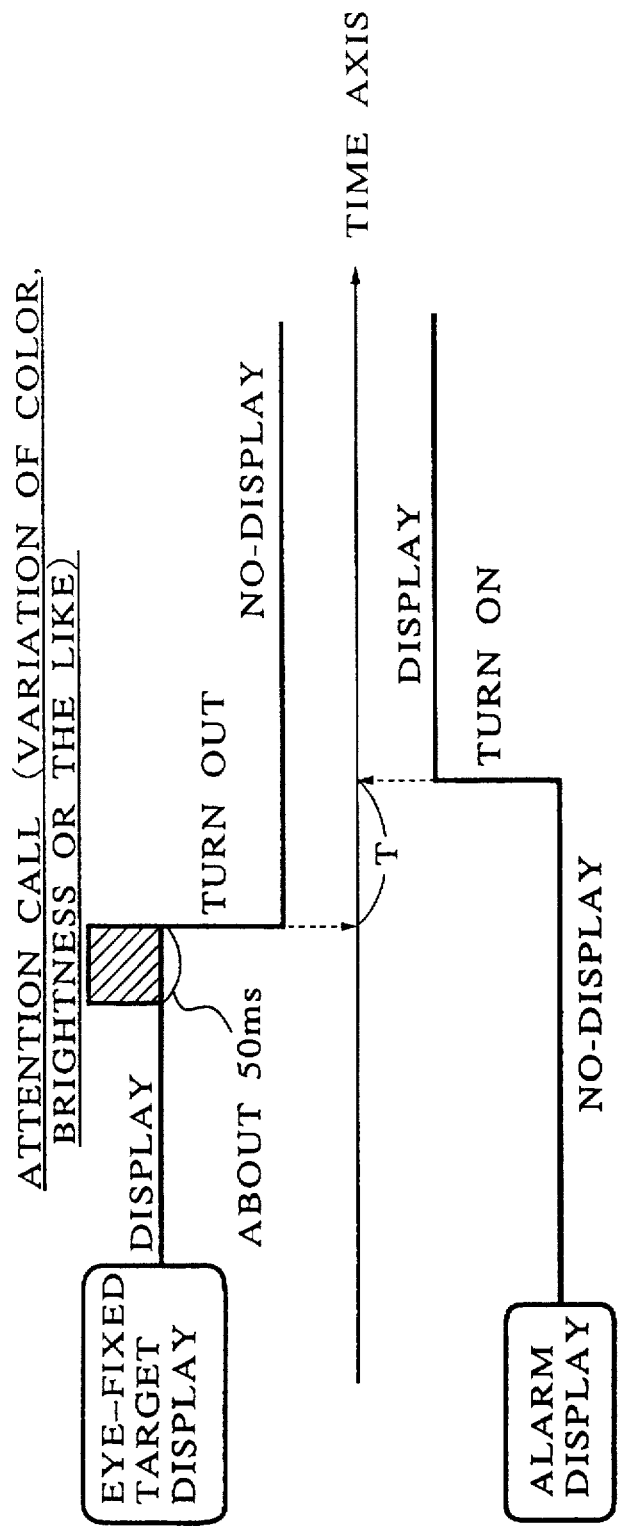
FIG. 16 is a time chart for the second embodiment.

FIG. 16 is a time chart for the second embodiment. As shown in FIG. 16, attention call (as indicated by a hatched area) is performed for about 50 ms just before the display cancellation (turn-out) of the eye-fixed target.

Figure 17A:
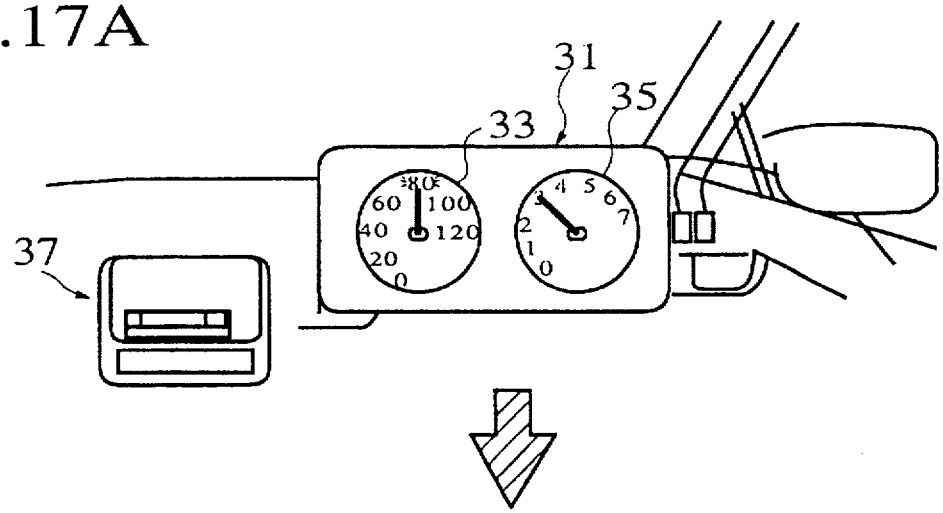
FIGS. 17A to 17C are diagrams showing an operation of the vehicle display device of the second embodiment.
Figure 17B:
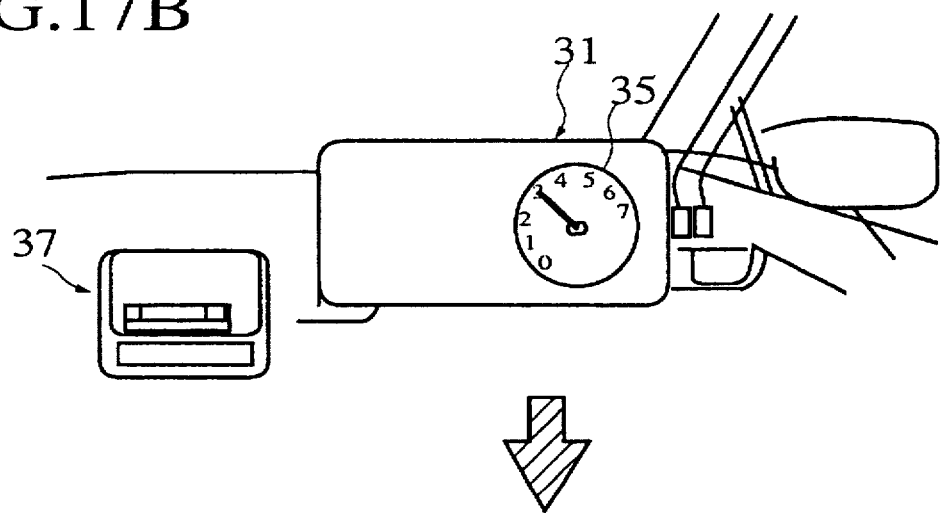
Figure 17C:
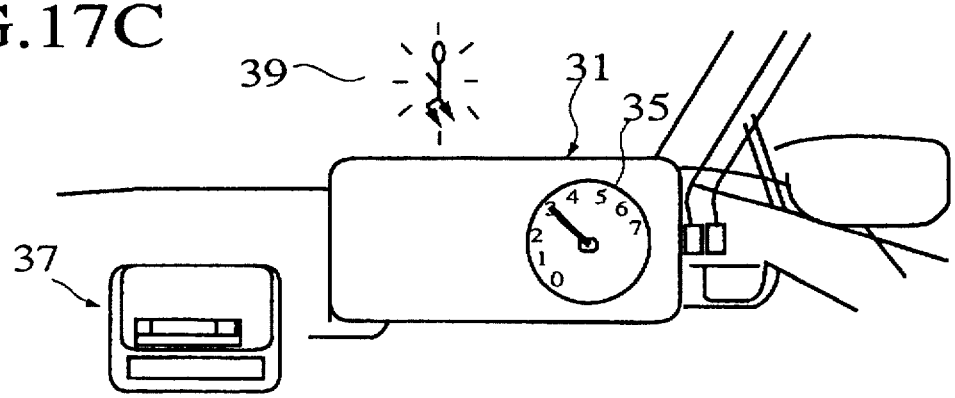

FIGS. 17A to 17B correspond to FIGS. 10A to 10C, and show display variation of the vehicle display device of this embodiment. The different point between the first and second embodiments resides in that a character "80" which is indicated with an indicator on the speedometer display 33 lights up for 50 ms just before the speedometer display 33 is canceled.

When the attention is called to the information display of the eye-fixed target as shown in FIG. 17A just before the display cancellation is performed on the eye-fixed target as shown in FIG. 17B, the reaction time until the recognition of the alarm display can be more shortened, so that the driver can take a more suitable action more quickly.

The reduction of the reaction time is based on SEAS (Super Express Attentional Shift) theory which was discovered by Professor Shimojo in Tokyo University.

Figure 18:
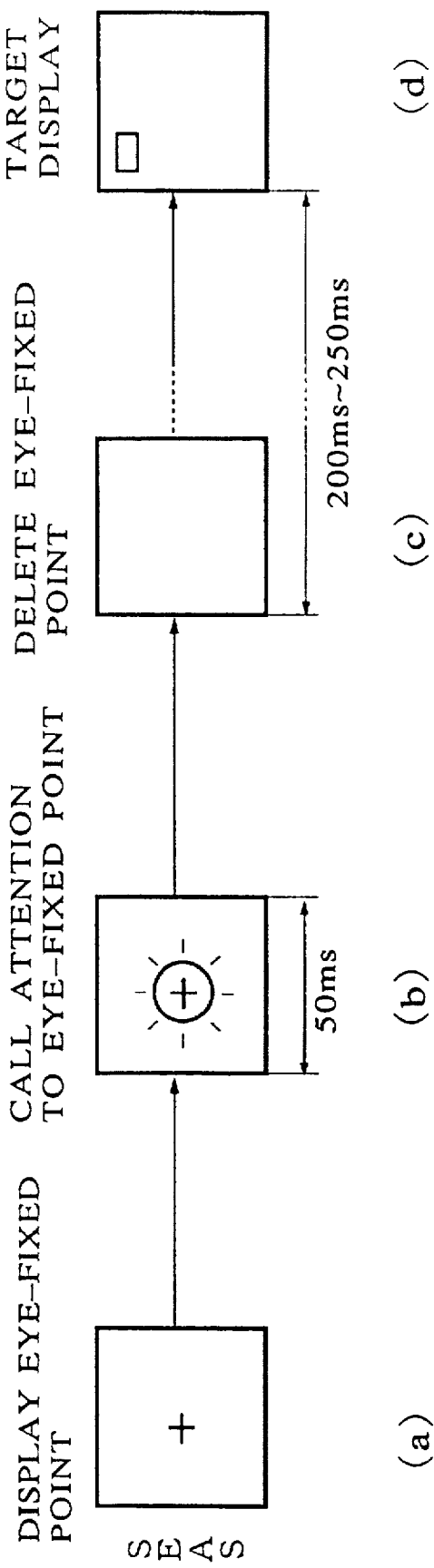
FIG. 18 is an explanatory diagram showing SEAS.

FIG. 18 is a diagram showing a SEAS experiment using a CRT. In the experiment, an eye-fixed point is displayed on the CRT in (a), and then the eye-fixed point is lighted up (the brightness thereof is increased) for 50 ms to call attention in (b). Thereafter, the eye-fixed point is deleted in (c), and after T=200 to 250 ms, a target display is performed in (d). That is, in this embodiment (FIG. 18), a step of calling attention to the eye-fixed point as shown in (b) is added to the first embodiment of FIG. 11.

Experiment results obtained under the above condition are shown in FIG. 12 and 13. That is, (4) of FIG. 12 represents an experiment result under an eye-fixed point brightness-increase deletion condition, that is, in a case where the information display of the eye-fixed target is lighted up or the like for a predetermined time just before the information display of the eye-fixed target is canceled to call driver's attention, then the information display of the eye-fixed target is canceled, and then an alarm display is performed after a predetermined time elapses from the display cancellation of the eye-fixed target. On the other hand, (3) of FIG. 12 represents an experiment result under an eye-fixed point brightness-increasing maintaining condition, that is, in a case where attention call is made, but the information display of the eye-fixed target is not canceled until the alarm display is performed. As is apparent from FIG. 12, the reaction time of (4) is shortest, and it is shorter than that of (2) under the eye-fixed point deletion condition (Express Attentional Shift) as described above.

Furthermore, as shown in FIG. 13, the reaction time under the eye-fixed point brightness-increase deletion condition (as indicated by (2) of FIG. 13) is still shorter than that of (1) of FIG. 13 under the eye-fixed point deletion condition. The reaction time of (2) at T=200 ms (deletion time, delay time) is less than RT=300 ms.

Accordingly, in the second embodiment in which the result as described above is applied to an alarm device for a vehicle, the operation and effect as described above can be surely achieved.

Various manners may be used as means of calling attention. For example, in place of variation of brightness of the information display of the eye-fixed target may be used variation of display color, variation of size of a display character, variation of contrast, provision of a signal of light on-and-off to the peripheral portion of the display or the like.

FIG. 18 is a timing chart for a third embodiment of the vehicle display device according to the present invention. In this embodiment, the delay time T is altered in accordance with emergency degree of the alarm display. The construction of the third embodiment is substantially identical to that of the first embodiment, however, a delay circuit 21 constituting the delay means CL6 is designed to alter the delay time T in accordance with the emergency degree of the alarm display as described above. In this embodiment, the emergency degree is classified into two degrees (high emergency and low emergency). For example, the emergency degree is judged to be low (i.e., high-emergency alarm display is required) for a pedestrian detection, an engine warning, an oil pressure warning, etc., while it is judged to be high (i.e., low-emergency alarm display (or normal alarm display whose urgency is not so high) is required) for non-attachment of a seat belt, a fuel warning, etc.

Figure 19A:
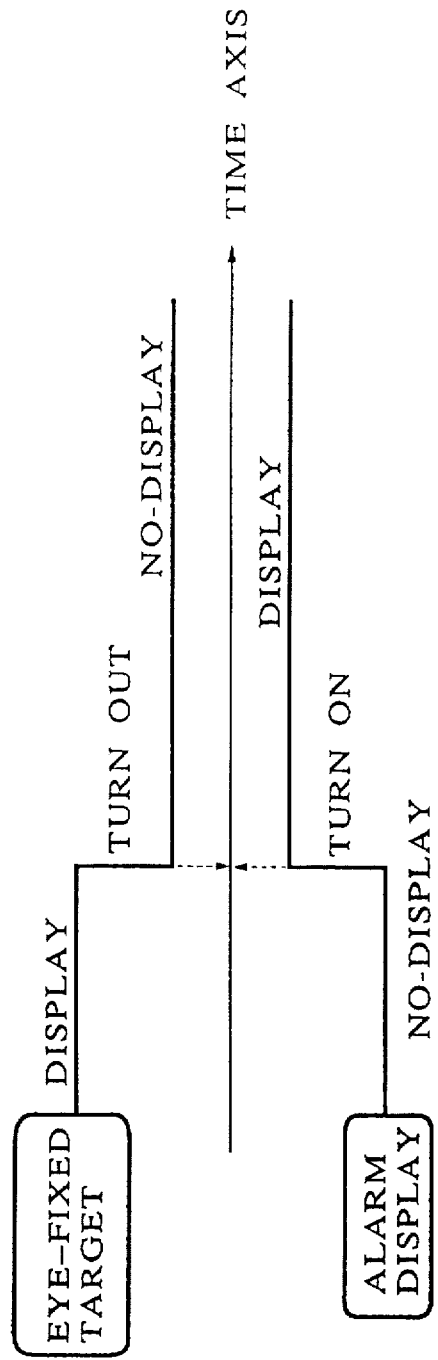
FIGS. 19A and 19B are time charts for a third embodiment of the vehicle display device according to the present invention.
Figure 19B:
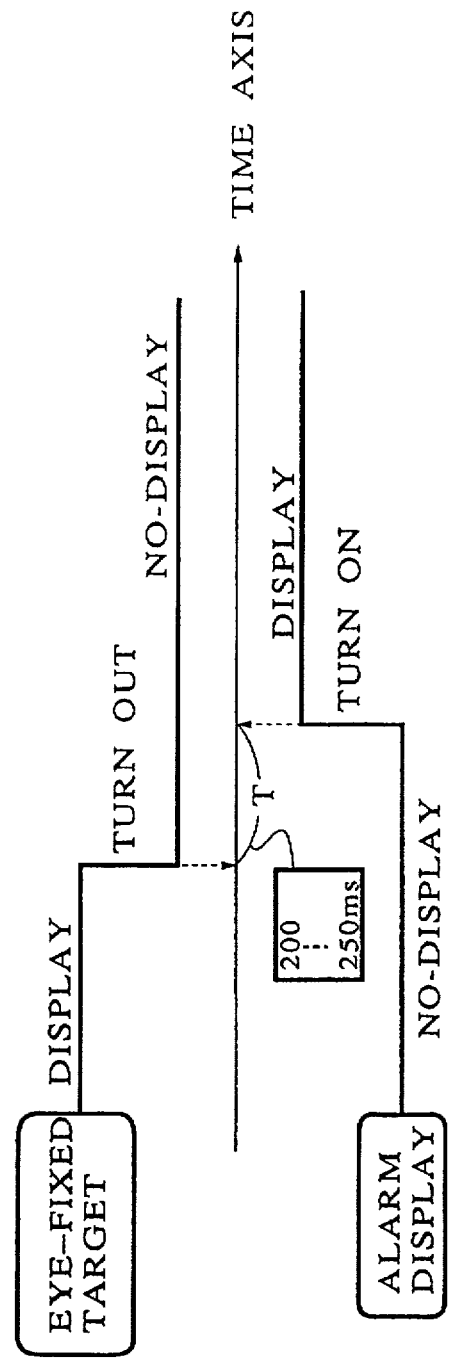

That is, for a high-emergency alarm display as shown in FIG. 19A, the alarm display is performed (turn on) simultaneously with the display cancellation (turn-out) of the eye-fixed target. On the other hand, for an alarm display whose emergency is not high as shown in FIG. 19B, like the first embodiment, the alarm display is performed (turned on) after a delay time T=200 to 250 ms elapses from the cancellation (turn-out) of the information display of the eye-fixed target. With this operation, when the alarm display is highly emergent, the driver can be allowed to recognize an alarm state as soon as possible.

The difference in perception time of the alarm display between the cases shown in FIGS. 19A and 19B is about 100 to 150 ms. The perception time is defined as a period from the time when a state needing an alarm is detected until the time when the driver perceives the alarm display. Accordingly, in the case of FIG. 19B, the alarm display can be also recognized more quickly using the EAS like each of the embodiments as described above. As is apparent from comparison between the cases shown in FIGS. 19A and 19B, the time from the start of the alarm display (turn-on) until the driver's recognition of the alarm display (i.e., the time when the driver recognizes the alarm display) is shorter in the case of FIG. 19B than in the case of FIG. 19A. Therefore, a labor which is unconsciously imposed on the driver for the recognition of the alarm display is lighter in the case of FIG. 19B than in the case of FIG. 19A, and thus fatigue which is imposed on the driver can be reduced more. The same effect can be also obtained in the embodiments as described above and embodiments as described later.

FIG. 20 is a block diagram showing a fourth embodiment of the vehicle display device according to the present invention.

The construction of this embodiment is basically similar to that of the first embodiment shown in FIG. 3, except that a drive's physiological state detector 55 serving as driver's physiological state detection means for detecting the physiological state of the driver is provided to the fourth embodiment. The driver's physiological state detector 55 serves to detect a driver's physiological state such as brain wave, heart rate, pulse, winking or the like and input the detection result to the controller 15.

The controller 15 is equipped with a physiology response varying circuit 57 which constitutes the physiology response varying means, and varies at least one of the attention call circuit 53, the delay circuit 21 and the alarm display unit 29 in accordance with the input driver's physiological state which is detected in the manner as described above. Specifically, an awakening degree of the driver is detected on the basis of increase of a power value on alpha wave of the driver's brain wave, winking frequency or the like, and a tension degree of the driver is detected on the basis of heat rate or alpha wave. For example, when the driver in a low awakening-degree state or a fatigue state, such a stimulant that induces greater attention call to the driver, for example, a greater variation in brightness of the information display than usually is induced just before the information display is canceled by the information display unit 27. Furthermore, in an emergent case, the attention call circuit 53 and the delay circuit 21 are suitably operated in accordance with the emergency to perform a proper alarm display. Accordingly, in this embodiment the alarm display can be suitably recognized by the driver in accordance with the driver's physiological state.

FIG. 21 is a block diagram showing a fifth embodiment of the vehicle display device according to the present invention. The basic construction of the fifth embodiment is substantially identical to that of the first embodiment, except that a vehicle state detector 59 constituting the vehicle state detection means is newly provided. The vehicle state detector 59 detects various states of the vehicle such as the speed of the vehicle, a steering angle, braking, etc. to a running state of the vehicle such as a vehicle speed, a curve running state, etc., and outputs the detection result into the controller 15. The controller 15 is provided with a vehicle response varying circuit 61. The vehicle response varying circuit 61 constitutes the vehicle response varying means, and serves to vary at least one of the attention call circuit 53, the delay circuit 21 and the alarm display unit 29 in accordance with the input vehicle state thus detected. The following running states are detected as the vehicle running state by respective sensors, etc. That is, a high and low speed running state is detected by a speed sensor, a curve running state is detected by a steering angle sensor, an urban-area running state in which the driver concentrates on his driving is detected by a shift variation pattern or braking frequency, etc. For example, considering that a safety driving is most important, a stronger stimulant for attention call is given to the driver by the attention call circuit 53 in a high-speed running state. This is because the driver is considered as being on low tension due to a simple driving in the high-speed running state. On the other hand, in a curve running state or a crowed urban-area running state, a stimulant which induces weaker attention call than usually to the driver, for example, a smaller variation in brightness than usually is given. With this operation, a more suitable alarm display can be recognized by the driver in accordance with the vehicle running state.

FIG. 22 is a block diagram showing a sixth embodiment of the vehicle display device according to the present invention.

The basic construction of this embodiment is substantially identical to that of the first embodiment of FIG. 3, except that an environmental state detector 63 constituting the environmental state detection means is newly provided. The environmental state detector serves to detect an amount of rainfall, an amount of sunshine, etc. to detect various vehicle running environmental states such as a rainy weather, nighttime, fog, dew, traffic jam, etc., and outputs the detection result to the controller 15. The controller 15 is equipped with an environment response varying circuit 65. The environment response varying circuit 65 constituting the environment response varying means, and serves to vary at least one of the attention call circuit 53, the delay circuit 21 and the alarm display unit 29 in accordance with the input running environmental state thus detected. Specifically, rain is detected by a raindrop sensor, daytime/nighttime is detected on the basis of an on/off operation of a head light, fog is detected on the basis of an on/off operation of a fog lamp, etc. Under a bad weather such as a rainy weather, fog or the like, a strong stimulant is given to the driver by the attention call circuit 53. In addition, the delay time T is set to zero second by the delay circuit 21 so that the driver can recognize the alarm display as soon as possible. Furthermore, in the nighttime, the color variation or brightness variation is used as the attention call by the attention call circuit 53. On the other hand, under a bright condition (e.g., in the daytime), the display size variation is used because it is not affected by light. Accordingly, in this embodiment, a more suitable alarm display can be recognized by the driver in accordance with the vehicle running environmental state.

Figure 23:
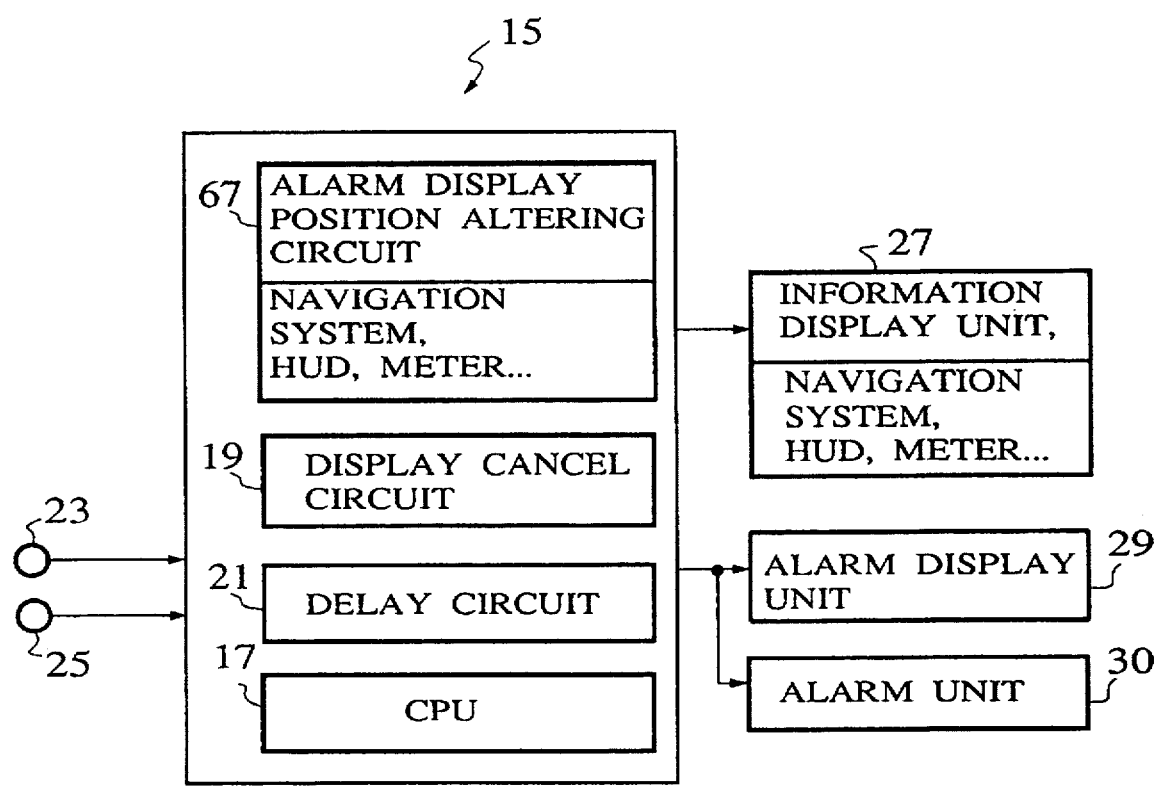
FIG. 23 is a block diagram showing a seventh embodiment of the vehicle display device according to the present invention.

FIG. 23 is a block diagram showing a seventh embodiment of the vehicle display device according to the present invention. The basic construction of this embodiment is substantially identical to that of the first embodiment shown in FIG. 2, except that the alarm display unit 29 is designed so that the position thereof is variable in accordance with variation of the eye-fixed target, and the controller 15 is equipped with an alarm display position altering circuit 67. The alarm display position altering circuit 67 constitutes the alarm display position altering means, and serves to alter the position of the alarm display in accordance with variation of the eye-fixed target. That is, the alarm display position altering circuit 67 determines the alarm display position on the basis of an eye-fixed target (HUD, meter cluster, navigation system or front look).

Figure 24:
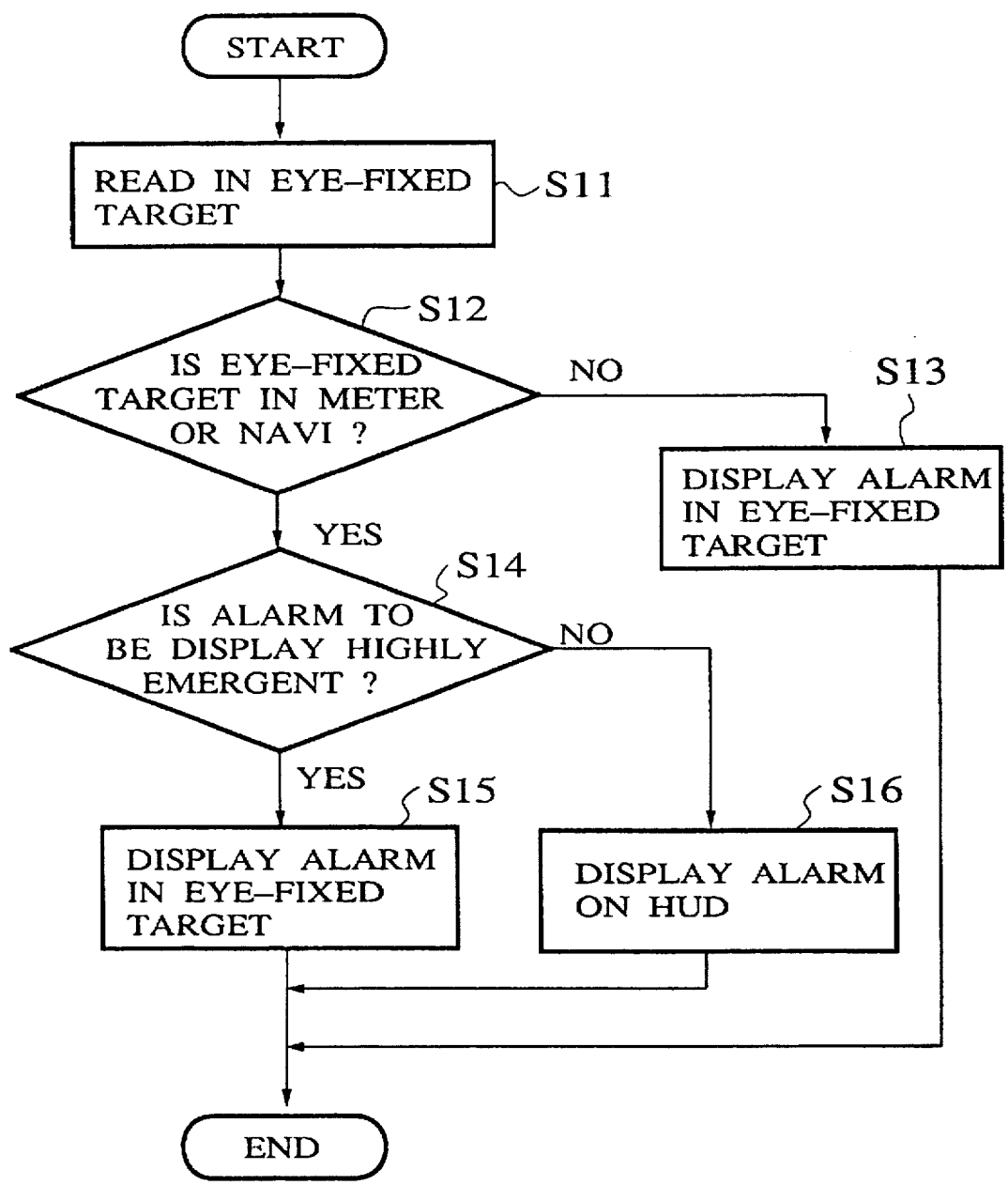
FIG. 24 is a flowchart for a seventh embodiment of the vehicle display device according to the present invention.

FIG. 24 is a flowchart for altering the alarm display position. A basic control is performed according to the flowchart of the first embodiment shown in FIG. 8, and a flowchart shown in FIG. 24 is newly added to the basic control flowchart. First, information on an eye-fixed target is first read in in step S11. Subsequently, it is judged in step S12 whether the eye-fixed target is a meter cluster or a navigation system. If the eye-fixed target is neither the meter cluster nor the navigation system, the program goes to step S13 to make an alarm display within the eye-fixed target, and then this flow is ended. If in step S12 the eye-fixed target is judged to be the meter cluster or the navigation system, the program goes to step S14 to judge whether an alarm to be displayed is highly emergent or not. If the alarm display is highly emergent, the alarm display is performed in the eye-fixed target such as the meter cluster or navigation system in step S15. On the other hand, if the alarm display is not highly emergent, the alarm display is performed on the HUD in step S16 to encourage the driver to look at the front side.

Through the control as described above, when the driver looks at the HUD which is displayed at the right side of the front, the alarm display is performed on the HUD at a portion near to the front. Furthermore, when the driver looks at the navigation system or the meter cluster, the alarm display is performed in the meter cluster or on a display unit of the navigation system. Furthermore, when the eye-fixed target is the meter cluster or navigation system, in order to enable the driver to look at the front side as much as possible, the display position of the alarm display is selectively altered in accordance with the emergency degree, for example, an alarm display of low emergency is performed on the HUD and an alarm display of high emergency is performed in the eye-fixed target. Accordingly, according to this embodiment, the alarm display can be quickly recognized in accordance with the emergency degree, and the driver can be encouraged to look at the front side, so that the driver's visual field at the driving time can be improved.

Figure 25:
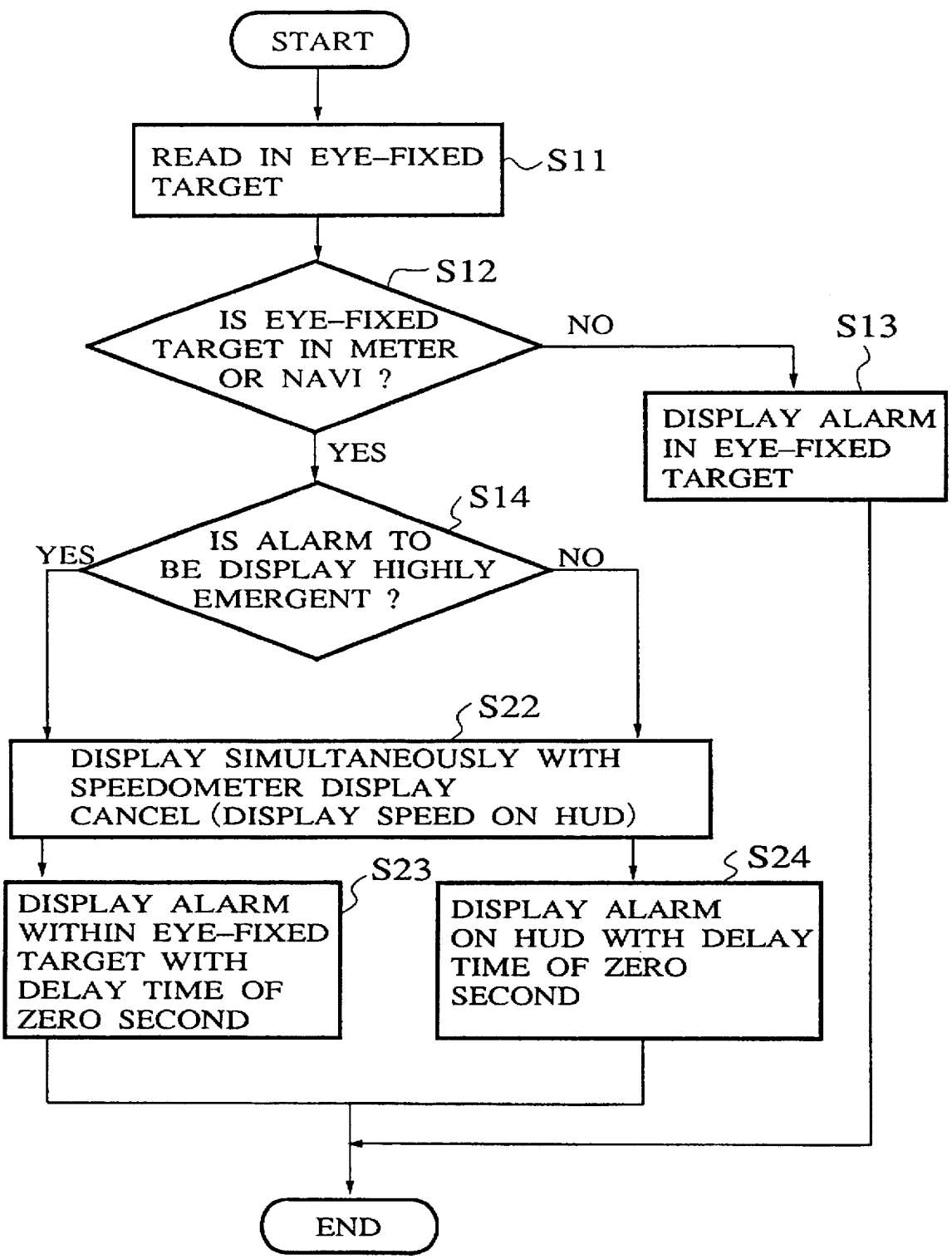
FIG. 25 is a flowchart for an eighth embodiment of the vehicle display device according to the present invention.

FIG. 25 is a flowchart for alteration of the alarm display position in an eighth embodiment of the vehicle display device according to the present invention. The same steps as the flowchart of FIG. 24 are represented by the same reference numerals, and the duplicate description thereof is omitted.

In the flowchart of FIG. 25, it is judged in step S21 whether the eye-fixed target is a speedometer display. If it is judged to be the speedometer display, a judgment on emergency degree is made in step S14 and then the program goes to step S22. In step S22, the speedometer display (speed display) is canceled to achieve EAS or SEAS, and at the same time the speed display is performed on the HUD. Subsequently, for an alarm display whose emergency is high, the alarm is displayed in the eye-fixed target with no delay time (T=0). On the other hand, for an alarm display whose emergency is not high, the alarm is displayed on the HUD with no delay time (T=0) in step S24. As described above, when the eye-fixed target is the speedometer display, the speed display can be kept on the HUD even when the speedometer display in the meter cluster is canceled. Furthermore, for the high-emergency alarm, the alarm display can be performed in the eye-fixed target, that is, the speedometer with no delay time (T=0), so that the driver can recognize the alarm display remarkably quickly. For the low-emergency alarm, the alarm display is performed on the HUD with no delay time (T=0), so that the driver is encouraged to look at the front side and recognize the alarm display quickly.

In the seventh and eighth embodiments as described above, when the alarm display is performed within the eye-fixed target, information display which is not needed except for the alarm display, for example, display of an engine rotational number, display of an audio/air conditioner, clock display, etc. (except for the speed display) may be canceled at the same time, or the display brightness thereof may be reduced. In this case, the alarm display can be made more remarkable, and the more quick recognition can be achieved.

Figure 26:
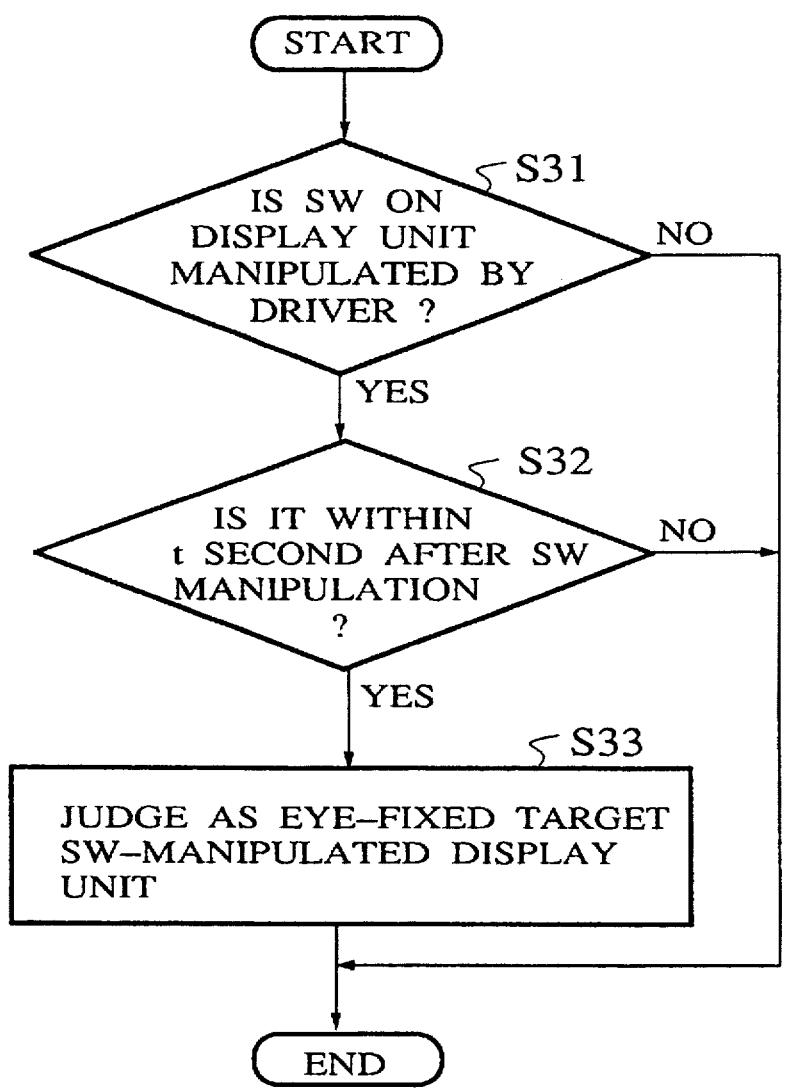
FIG. 26 is a flowchart for a ninth embodiment of the vehicle display device according to the present invention.

FIG. 26 is a flowchart of a ninth embodiment of the vehicle display device according to the present invention. The basic control of this embodiment is based on that of the first embodiment shown in FIG. 8. In this embodiment, the information display just after the driver (passenger) manipulates a switch for the information display is judged as the eye-fixed target.

First, in step S31 it is judged whether the driver manipulates a switch on the information display unit. If the switch is judged to be manipulated, it is judged at S32 whether a predetermined time t (for example, 5 seconds) elapses from the actuation of the switch. This is because the driver is expected to look at the information display in association with the switch within about 5 seconds after the switch is manipulated (actuated) by the driver. Accordingly, if it is within the t second, the information display in association with the manipulated switch is judged as the eye-fixed target in step S33. That is, with respect to a display device such as a navigation system which is switched on by the driver to display information on a display frame, the driver is expected to look at the display frame of the display device just after the driver switches on the display device. Therefore, the information display (display device) is judged as the eye-fixed target, and it is used for the control operation of the first embodiment or the like. As described above, by using the switch-on operation for the eye-fixed target judgment, the display device can be designed in extremely simple construction and in low cost.

Figure 27:
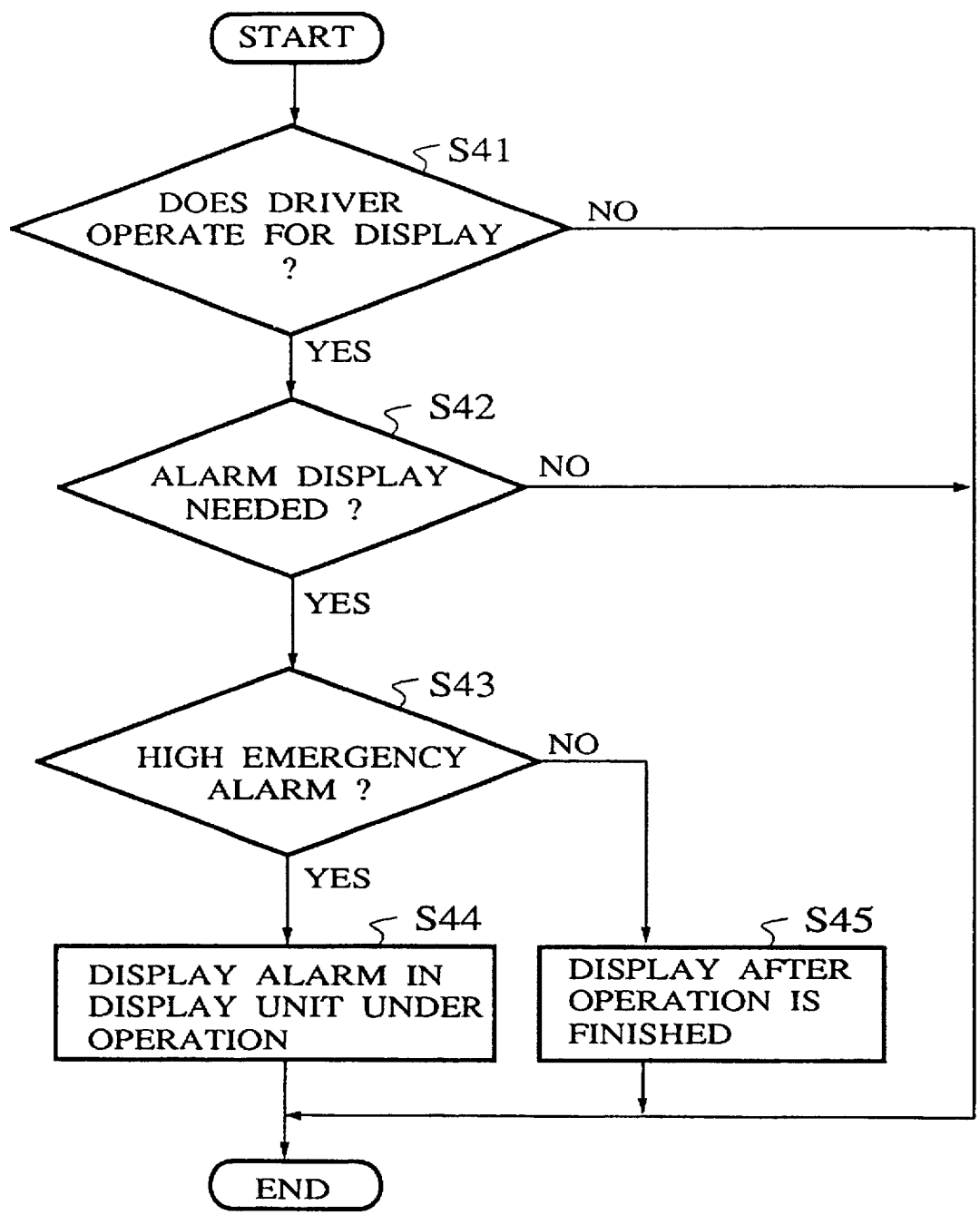
FIG. 27 is a flowchart for a tenth embodiment of the vehicle display device according to the present invention.

FIG. 27 is a flowchart for a tenth embodiment of the vehicle display device according to the present invention. The basic control of this embodiment is based on the flowchart of the first embodiment shown in FIG. 8 or the like. In this embodiment, the information display in accordance with an operation of the driver is judged as the eye-fixed target, and the low-emergency alarm display is performed after the operation of the information display means is completed while the high-emergency alarm display is performed within the information display during the operation. That is, it is judged in step S41 whether the driver conducts an operation which is associated with the display. If the operation is conducted, it is judged in step S42 whether the alarm display is necessary or not. If the alarm display is judged to be necessary, the emergency degree for the alarm display is judged in step S43. If the emergency degree is high, the alarm display is performed in the display unit during the operation in step S44. In this case, the delay time T in the delay circuit 21 shown in FIG. 3 is not set. If the emergency degree is not high, the alarm display is performed after the operation is completed in step S45. In this case, the delay time T is set. Accordingly, for the high-emergency alarm display, the alarm is displayed within the display unit on which the driver fixes his eyes during the operation, so that the driver can immediately recognize the alarm display. For the low-emergency (not high emergency) alarm display, the alarm is displayed at a portion other than the display unit after the operation is completed, so that the driver's visual field during the driving can be enlarged. In the above embodiments, the eye-fixed target display itself is canceled. However, the eye-fixed point disperses in accordance with an individual, and thus it cannot be regarded as a fixed range. Therefore, the alarm display may be performed in the vicinity of the eye-fixed point without canceling the eye-fixed target display itself.

As is apparent from the above embodiments, according to the first aspect (claim 1) of the present invention, the recognition of the alarm display can be quickly performed with a predetermined time period from the cancellation of the information display which is the eye-fixed target until the alarm display. In addition, the recognition time from the start of the alarm display until the recognition of the alarm display can be shortened, so that the unconscious labor of the driver which is required for the recognition can be reduced, and thus the fatigue imposed on the driver can be also reduced. Accordingly, the driver can take a more quick and suitable action such as approach of a pedestrian to the vehicle, engine failure, reduction of oil pressure, non-attachment of a seat belt, reduction of fuel, etc.

According to the second aspect (claim 2) of the present invention, in addition to the effect of the first aspect (claim 1), the driver's line-of-sight to the eye-fixed target can be smoothly released by attention call, and the driver's recognition of the alarm display can be made more quick. Accordingly, the driver can make a more suitable action.

According to the third aspect (claim 3) of the present invention, in addition to the effect of the first (claim 1) or second (claim 2) aspect, the predetermined time from the display cancellation until the alarm display is variable (delayed) in accordance with the emergency degree. Therefore, for the high-emergency alarm, the alarm display is immediately performed, and thus the alarm display can be matched with the emergency degree.

According to the fourth aspect (claim 4) of the present invention, in addition to any one of the first to third aspects (claims 1 to 3), the attention call state or the like can be altered in accordance with the physiological state of the driver such as a tension state or the like, so that the driver can suitably recognize the alarm display in accordance with his physiological state.

According to the fifth aspect (claim 5) of the present invention, in addition to any one of the effects of the first to fourth aspects (claims 1 to 4), the attention call or the like can be altered in accordance with the vehicle running state such as a vehicle speed, a curve running state or the like, so that the driver can suitably recognize the alarm display in accordance with the vehicle running state.

According to the sixth aspect (claim 6) of the present invention, in addition to any one of the effects of the first to fifth aspects (claims 1 to 5), the attention call or the like can be altered in accordance with the vehicle running environmental state such as a rainy weather, nighttime or the like, so that the driver can suitably recognize the alarm display in accordance with the vehicle running environmental state.

According to the seventh aspect (claim 7), in addition to any one of the effects of the second to sixth aspects (claims 2 to 6), the attention call can be surely performed by visual stimulation such as variation of brightness of the information display or the like, so that the driver can suitably recognize the alarm display.

According to the eighth aspect (claim 8), in addition to any one of the effects of the first to seventh aspects (claims 1 to 7), the alarm display position is altered in accordance with variation of the eye-fixed target, so that the driver can recognize quickly in accordance with the eye-fixed target.

According to the ninth aspect (claim 9), in addition to the effect of the eighth aspect (claim 8), the alarm display position can be altered in accordance with the emergency degree. For a high-emergency alarm, the alarm display can be immediately performed so that the driver can immediately recognize the alarm display. For a low-emergency alarm, the alarm display is performed so that the driver can recognize the alarm display quickly and he is encouraged to look at the front side.

According to the tenth aspect (claim 10), in addition to the effect of the ninth aspect (claim 9), for a low-emergency alarm, the alarm display is performed on the head-up display to encourage the driver to look at the front side. On the other hand, for a high-emergency alarm, the alarm display is performed on the meter cluster or navigation system so that the driver can immediately recognize the alarm display.

According to the eleventh aspect (claim 11), in addition to the effect of the eighth aspect (claim 8), when the eye-fixed target is the speedometer of the meter cluster, the speed can be displayed on the head-up display even when the speedometer display is canceled, and thus the speed display can be kept at all times.

According to the twelfth aspect (claim 12), in addition to any one of the effects of the first to eleventh aspects (claims 1 to 11), the alarm display can be made remarkable by performing at least one of cancel of information display other than the alarm display and reduction of the display brightness of the information display, so that the driver can more smoothly recognize the alarm display.

According to the thirteenth aspect (claim 13), in addition to any one of the effects of the first to twelfth aspects (claims 1 to 12), the eye-fixed target can be detected by the line-of-sight detection unit, so that the eye-fixed target can be surely detected.

According to the fourteenth aspect (claim 14), in addition to any one of the effects of the first to twelfth aspects (claims 1 to 12), the eye-fixed target can be detected on the basis of the switching operation by the driver (passenger). Therefore, the eye-fixed target can be detected with a simple construction, and the cost of the device can be reduced remarkably.

According to the fifteenth aspect (claim 15), in addition to any one of the effects of the first to twelfth aspects (claims 1 to 12), the information display in accordance with the driver's operation is detected as the eye-fixed target. A low-emergency alarm is displayed after the driver's operation is finished, so that the driver is encouraged to look at the front side. On the other hand, a high-emergency alarm is displayed within the information display which is being operated by the driver, so that the driver can recognize the alarm display as soon as possible.

What is claimed is:

1. A vehicle display system, comprising:
   a first information display;
   an alarm display;
   an alarm state detector;

a circuit responsive to detection of an alarm state by the alarm state detector, for canceling the first information display and activating the alarm display after a predetermined time has elapsed after the cancellation of the first information display;

a second information display; and a target detector for determining whether a driver's eyes are fixed on the first or the second information display, wherein the circuit cancels the first information display if the target detector determines that the driver's eyes are fixed on the first information display and cancels the second information display if the target detector determines that the driver's eyes are fixed on the second information display.

2. The vehicle display system as claimed in claim 1, wherein the target detector comprises a line-of-sight detector having an eye camera for producing a signal in accordance with movements of the driver's eyes, the signal being used to determine whether the driver's eyes are fixed on the first or the second information display.

3. A vehicle display device, comprising:

an information display unit for displaying a prescribed information for a vehicle;

an alarm need state detector for detecting a prescribed state where an alarm for the vehicle is needed;

an alarm display unit for displaying an alarm on the basis of the detection of said alarm need state detector;

an eye-fixed target detector for detecting an eye-fixed target on which driver's eyes are fixed;

a display cancel circuit for canceling the prescribed information display near the eye-fixed target; and a delay circuit for controlling said alarm display unit displaying an alarm after a predetermined time lapses from the display cancellation by said display cancel circuit.

4. The vehicle display device as claimed in claim 3, wherein said display cancel circuit is provided with an attention call circuit for inducing a display variation to the prescribed information delay near the eye-fixed target just before said display cancel circuit carries out the display cancellation.

5. The vehicle display device as claimed in claim 3, wherein said delay circuit alters the predetermined time to be delayed in accordance with an emergency degree of the alarm display.

6. The vehicle display device as claimed in claim 4, further including a physiological state detector for detecting a physiological state of a driver, and a physiology response varying circuit for varying at least one of said attention call circuit, said delay circuit and said alarm display unit in accordance with the physiological state detected by said physiological state detector.

7. The vehicle display device as claimed in claim 4, further including vehicle state detector for detecting a vehicle running state and vehicle response varying circuit for varying at least one of said attention call circuit, said delay circuit and said alarm display unit in accordance with the vehicle running state.

8. The vehicle display device as claimed in claim 4, further including environmental state detector for detecting an environmental state of the running vehicle and environment response varying circuit for varying at least one of said attention call circuit, said delay circuit and said alarm display unit in accordance with the environmental state of the running vehicle.

9. The vehicle display device as claimed in claim 4, wherein said attention call circuit performs at least one of variation of brightness, variation of color, variation of size and turning on-and-off of the prescribed information display near the eye-fixed target.

10. The vehicle display device as claimed in claim 3, wherein said alarm display unit changes the position of the alarm display in accordance with variation of the eye-fixed target, and said alarm display unit is provided with alarm display position altering circuit for altering the position of the alarm display in accordance with the variation of the eye-fixed target.

11. The vehicle display device as claimed in claim 10, wherein said alarm display unit changes the alarm display position in accordance with an emergency degree of the alarm display.

12. The vehicle display device as claimed in claim 11 wherein, when the eye-fixed target is a meter cluster or a navigation system, said alarm display unit displays on a head-up display an alarm whose emergency degree is not so high, and displays within the eye-fixed target an alarm whose emergency degree is high.

13. The vehicle display device as claimed in claim 10, wherein when the eye-fixed target is a speedometer of the meter cluster, said display cancel circuit displays a speed on the head-up display just after a speedometer display is canceled.

14. The vehicle display device as claimed in claim 3, wherein said display cancel circuit cancels display of information other than the alarm display and reduces display brightness when the prescribed information display near the eye-fixed target is canceled.

15. The vehicle display device as claimed in claim 3, wherein said eye-fixed target detector comprises a line-of-sight detector.

16. The vehicle display device as claimed in claim 3, wherein said eye-fixed detector judges, as the eye-fixed target, an information display just before a switch-on operation by a driver.

17. The vehicle display device as claimed in claims 3, wherein said eye-fixed target detector detects, as the eye-fixed target, an information display corresponding to an operation of a driver, wherein said delay circuit sets a predetermined time for an alarm display whose emergency degree is not high while said delay circuit does not set a predetermined time for an alarm display whose emergency degree is high, and wherein said alarm display unit displays the alarm display whose emergency degree is not high after the operation of the driver is completed while said alarm display unit displays the alarm display of high emergency degree within the information display during the operation of the driver.

* * * * *